(12) United States Patent
Ramirez Giraldo et al.

(10) Patent No.: US 8,897,529 B2
(45) Date of Patent: Nov. 25, 2014

(54) APPARATUS, SYSTEM, AND METHOD FOR NON-CONVEX PRIOR IMAGE CONSTRAINED COMPRESSED SENSING

(75) Inventors: Juan Carlos Ramirez Giraldo, Rochester, MN (US); Joshua Trzasko, Rochester, MN (US); Shuai Leng, Rochester, MN (US); Armando Manduca, Rochester, MN (US); Cynthia H. McCollough, Byron, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 178 days.

(21) Appl. No.: 13/192,108

(22) Filed: Jul. 27, 2011

(65) Prior Publication Data

US 2012/0027280 A1 Feb. 2, 2012

Related U.S. Application Data

(60) Provisional application No. 61/368,139, filed on Jul. 27, 2010.

(51) Int. Cl.
*G06K 9/00* (2006.01)
*G06T 11/00* (2006.01)

(52) U.S. Cl.
CPC ......... *G06T 11/006* (2013.01); *G06T 2211/412* (2013.01); *G06T 2211/424* (2013.01); *G06T 2211/436* (2013.01)
USPC ............................ 382/131; 324/309; 382/118

(58) Field of Classification Search
None
See application file for complete search history.

(56) References Cited

U.S. PATENT DOCUMENTS

| | | | | |
|---|---|---|---|---|
| 7,602,183 | B2 | 10/2009 | Lustig et al. | 324/309 |
| 8,194,937 | B2* | 6/2012 | Chen | 382/118 |
| 8,310,233 | B2* | 11/2012 | Trzasko et al. | 324/309 |
| 2006/0029279 | A1 | 2/2006 | Donoho | 382/232 |
| 2009/0161933 | A1* | 6/2009 | Chen | 382/131 |
| 2009/0175523 | A1 | 7/2009 | Chen et al. | 382/130 |
| 2009/0262996 | A1 | 10/2009 | Samsonov et al. | 382/130 |
| 2009/0274355 | A1* | 11/2009 | Chen et al. | 382/131 |
| 2010/0207629 | A1* | 8/2010 | Trzasko et al. | 324/309 |

OTHER PUBLICATIONS

Chartrand, "Fast Algorithms for Nonconvex Compressive Sensing: MRI Reconstruction from Very Few Data" *Boimedical Imaging: From Nano to Macro, IEEE International Symposium.* 2009, p. 262-265.

Chartrand, "Exact reconstruction of sparse signals via nonconvex minimization," *IEEE Signal Processing Letters*, 14(10):707-710, 2007.

Chen et al., "Prior image constrained compressed sensing (PICCS): A method to accurately reconstruct dynamic CT images from highly undersampled projection data sets," *Med. Phys.*, 35(2):660-663, 2008.

(Continued)

*Primary Examiner* — Tsung-Yin Tsai
(74) *Attorney, Agent, or Firm* — Fulbright & Jaworski LLP

(57) ABSTRACT

Methods, systems, and apparatuses for non-convex prior image constrained compressed sensing are disclosed. In one embodiment, a method is provided for iterative image reconstruction for medical imaging applications which employ a prior image to constrain the reconstruction process allowing the use of fewer high SNR samples or complete but lower SNR samples. The objective function made use of non-convex compressed sensing methods during the iterative reconstruction process. Applications include, but are not limited to radiation dose reduction and fast image acquisition.

33 Claims, 28 Drawing Sheets

(56) References Cited

OTHER PUBLICATIONS

Donoho, "Compressing Sensing," *IEEE Transactions on Information Theory,* 52(4):1289-1306, 2006.

Leng et al., "High temporal resolution and streak-free four-dimensional cone-beam computed tomography," *Physics in Medicine and Biology,* 53:5653-5673, 2008.

Lustig et al., "Compressing Sensing MRI," *IEEE Signal Processing Magazine,* 25(2):72-82, 2008.

Lustig et al., "Sparse MRI: The application of compressing sensing for rapid MR imaging," *Magnetic Resonance in Medicine,* 58:1182-1195, 2007.

Trzasko and Manduca, "Highly undersampled magnetic resonance image reconstruction via homotopic L0-minimization," *IEEE Transactions on Medical Imaging,* 28(1):106-121, 2009.

\* cited by examiner

US 8,897,529 B2

APPARATUS, SYSTEM, AND METHOD FOR NON-CONVEX PRIOR IMAGE CONSTRAINED COMPRESSED SENSING

CROSS-REFERENCE TO RELATED APPLICATIONS

This application claims priority to U.S. Provisional Application No. 61/368,139 filed Jul. 27, 2010, the entire contents of which is specifically incorporated herein by reference.

BACKGROUND OF THE INVENTION

1. Field of the Invention

This invention relates to image reconstruction and image processing and more particularly relates to an apparatus, system and method for non-convex prior image constrained compressed sensing.

2. Description of the Related Art

There continues to be increased concern about the radiation dose received during certain medical imaging procedures, such as multidetector computed tomography (MDCT) or cone beam computed tomography (CBCT). As a result, there is much interest in finding methods to reduce patient doses. Similarly, it is important to find methods for rapid imaging both in x-ray based imaging modalities such as MDCT and CBCT, but also magnetic resonance imaging (MRI).

SUMMARY OF THE INVENTION

Methods, systems, and apparatuses are presented for non-convex prior image constrained compressed sensing. In one embodiment, the method includes acquiring image data from an image acquisition device, generating an image from the image data according to a non-convex prior image constrained compressed sensing algorithm performed in a data processor, storing at least one of the image and the image data in a data storage device, and displaying the image on an image display device.

In another embodiment, the method includes receiving a plurality of projection datasets which will be used to create the images. Each projection dataset is acquired at one of a plurality of time points, from an image acquisition device. This embodiment may also include storing the plurality of projection and image datasets in a data storage device. Additionally, the method may include selecting a first dataset corresponding to a first time point, and selecting a first group of datasets corresponding to a range of time points that includes the first time point. The method may also include generating, using a data processor, an output image corresponding to the first time point according to a non-convex prior image constrained compressed sensing algorithm performed on the first data using information from the first group of datasets.

In a further embodiment, the method includes storing the output image in a data storage device. Additionally, the method may include displaying the image on an image display device. In a particular embodiment, the first dataset corresponds to a first image, and the first group of datasets corresponds to a first composite image.

In one embodiment, generating the output image includes computing the minimization of the objective function $\min_x [\alpha \cdot \rho(|\Psi_1(x-x_{pr})|) + (1-\alpha) \cdot \rho(|\Psi_2 x|)]$ s.t. $\Phi x = f$. The minimization process comprises computing a gradient in response to the first dataset and the first group of datasets, the gradient indicating a direction for adjusting the first dataset. For example, computing the gradient may include calculating, using the data processor, a result of $L(x) = \alpha \Psi_1^* \Lambda(x-x_{pr})\Psi_1(x-x_{pr}) + (1-\alpha)\Psi_2^* \Lambda(x)\Psi_2 x + \lambda \Phi^* \Phi x - \lambda \Phi^* f$ in response to the first dataset and the first group of datasets. Additionally, generating the output image may also include calculating, using a data processor, a result of the function $B(x) = \alpha \Psi_1^* \Lambda(x-x_{pr})\Psi_1 + (1-\alpha)\Psi_2^* \Lambda(x)\Psi_2 + \lambda \Phi^*$ in response to the first dataset and the first group of datasets. In a further embodiment, generating the output image includes iteratively calculating, using the data processor, a result of the function $x_{t+1} = x_t - B^{-1}(x_t) L(x_t)$.

In one embodiment, the non-convex prior image constrained compressed sensing algorithm may run iteratively until a predetermined stopping criteria is reached. For example, the predetermined stopping criteria may include a predetermined range of results of the function $L(x) = \alpha \Psi_1^* \Lambda(x-x_{pr})\Psi_1(x-x_{pr}) + (1+\alpha)\Psi_2^* \Lambda(x)\Psi_2 x + \lambda \Phi^* \Phi x - \lambda \Phi^* f$, the predetermined range of results centered about a value of zero. Alternatively, the predetermined stopping criteria may be a preselected number of calculation iterations. In the iterative embodiment, the method may also include selecting a second dataset corresponding to a second time point in response to a determination that the predetermined stopping criteria was reached for the first dataset, selecting a second group of datasets corresponding to a range of time points that includes the second time point, and generating, using the data processor, an output image corresponding to the second time point according to the non-convex prior image constrained compressed sensing algorithm performed on the second data using information from the second group of datasets.

The method may also include acquiring the plurality of image datasets with an image acquisition device. In particular, the image acquisition device may be a multi detector CT scanner, a cone beam CT scanner, a Magnetic Resonance Imaging (MRI) Scanner, or other types of image capture devices including video cameras, radar scanners, Radio Frequency (RF) imaging devices, and ultrasound devices.

A tangible computer program product is also presented. In one embodiment, the tangible computer program product includes a computer readable medium having computer usable program code, that when executed by a computer, causes the computer to perform various operations. For example, the operations may include receiving a plurality of image datasets, each image dataset acquired at one of a plurality of time points, storing the plurality of image datasets, selecting a first dataset corresponding to a first time point, selecting a first group of datasets corresponding to a range of time points that includes the first time point, and generating an output image corresponding to the first time point according to a non-convex prior image constrained compressed sensing algorithm performed on the first data using information from the first group of datasets.

In a further embodiment, the operations may include storing the output image. The operations may also include displaying the image.

In one embodiment, the first dataset corresponds to a first image and the first group of datasets corresponds to a first composite image. Additionally, generating the output image may include computing a gradient in response to the first dataset and the first group of datasets, the gradient indicating a direction for adjusting the first dataset. For example, computing the gradient may include calculating $L(x) = \alpha \Psi_1^* \Lambda(x-x_{pr})\Psi_1(x-x_{pr}) + (1-\alpha)\Psi_2^* \Lambda(x)\Psi_2 x + \lambda \Phi^* \Phi x - \lambda \Phi^* f$ in response to the first dataset (first image) and the first group of datasets (first composite image). Generating the output image may also include calculating a result of the function $B(x) = \alpha \Psi_1^* \Lambda(x-x_{pr})\Psi_1 + (1-\alpha)\Psi_2^* \Lambda(x)\Psi_2 + \lambda \Phi^* \Phi$ in response to the first dataset and the first group of datasets. Additionally, generating the output image may include calculating a result of the $x_{t+1} = x_t - B^{-1}(x_t) L(x_t)$.

In a further embodiment, the operations may run the non-convex prior image constrained compressed sensing algorithm iteratively until a predetermined stopping criteria is reached. For example, the predetermined stopping criteria may include a predetermined range of results of the function $L(x) = \alpha \Psi_1^* \Lambda(x-x_{pr}) \Psi_1 (x-x_{pr}) + (1-\alpha) \Psi_2^* \Lambda(x) \Psi_2 x + \lambda \Phi^* \Phi x - \lambda \Phi^* f$, the predetermined range of results centered about a value of zero. Alternatively, the predetermined stopping criteria may be a preselected number of calculation iterations. In such embodiments, the operations may also include selecting a second dataset corresponding to a second time point in response to a determination that the predetermined stopping criteria was reached for the first data set, selecting a second group of datasets corresponding to a range of time points that includes the second time point, and generating an output image corresponding to the second time point according to the non-convex prior image constrained compressed sensing algorithm performed on the second data using information from the second group of datasets.

The operations may also include acquiring the plurality of image datasets with an image acquisition device coupled to the computer. For example, the image acquisition device may be a CT scanner.

A system is also presented. In one embodiment, the system includes an image acquisition device, a data storage device, and a data processing device. The image acquisition device may acquire a plurality of image datasets, each image dataset acquired at one of a plurality of time points. The data storage device may store the plurality of image datasets. In one embodiment, the data processing device is coupled to the image acquisition device and the data storage device. In such an embodiment, the data processing device may include an input adapter and a processor. The input adapter may receive the plurality of image datasets. The processor may be suitably programmed to select a first dataset corresponding to a first time point, select a first group of datasets corresponding to a range of time points that includes the first time point, and generate an output image corresponding to the first time point according to a non-convex prior image constrained compressed sensing algorithm performed on the first data using information from the first group of datasets.

In a further embodiment, the image acquisition device comprises a multidetector CT scanner or cone beam CT scanner. Alternatively, the image acquisition device comprises an MRI scanner. One of ordinary skill in the art will recognize additional image acquisition devices that may be suitable for use in the present systems and methods. In a further embodiment, the system may include an image display device, coupled to at least one of the data storage device and the data processing device, configured to display the output image.

An apparatus is also presented. In one embodiment, the apparatus includes an input adapter, a memory device, and a processor. The input adapter may receive a plurality of image datasets, each image dataset acquired at one of a plurality of time points by an image acquisition device. The memory device may store the plurality of image datasets. In one embodiment, the processor may select a first dataset corresponding to a first time point, select a first group of datasets corresponding to a range of time points that includes the first time point, and generate an output image corresponding to the first time point according to a non-convex prior image constrained compressed sensing algorithm performed on the first data using information from the first group of datasets.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
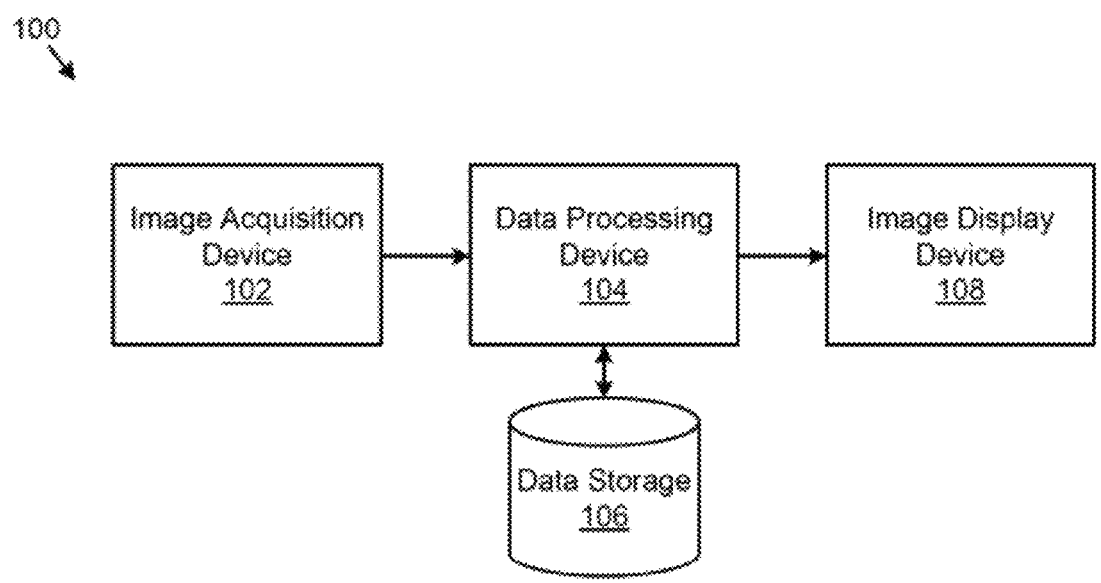
FIG. 1 is a schematic block diagram illustrating one embodiment of a system for non-convex prior image constrained compressed sensing.
Figure 3:
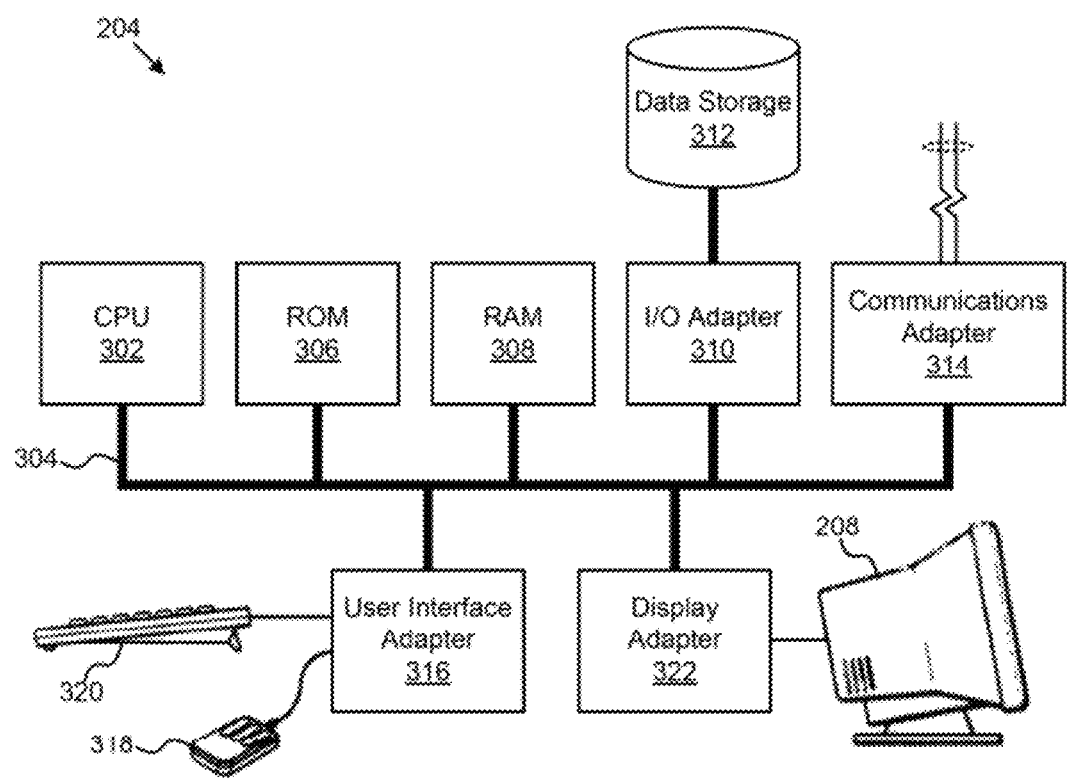
FIG. 3 is a schematic block diagram of one embodiment of a computer device suitable for use in a system for non-convex prior image constrained compressed sensing.

FIG. 1 is a schematic block diagram illustrating one embodiment of a system 100 for non-convex prior image constrained compressed sensing. In one embodiment, the system 100 includes an image acquisition device 102, a data storage device 106, and a data processing device 104. The image acquisition device 102 may acquire a plurality of image datasets, each image dataset acquired at one of a plurality of time points. The data storage device 106 may store the plurality of image datasets. In one embodiment, the data processing device 104 coupled to the image acquisition device 102 and the data storage device 106. In such an embodiment, the data processing device 104 may include an input adapter 310 and a processor 302, as illustrated in FIG. 3. The input adapter 310 may receive the plurality of image datasets. The processor 302 may be suitably programmed to select a first dataset corresponding to a first time point, select a first group of datasets corresponding to a range of time points that includes the first time point, and generate an output image corresponding to the first time point according to a non-convex prior image constrained compressed sensing algorithm performed on the first data using information from the first group of datasets.

Figure 2:
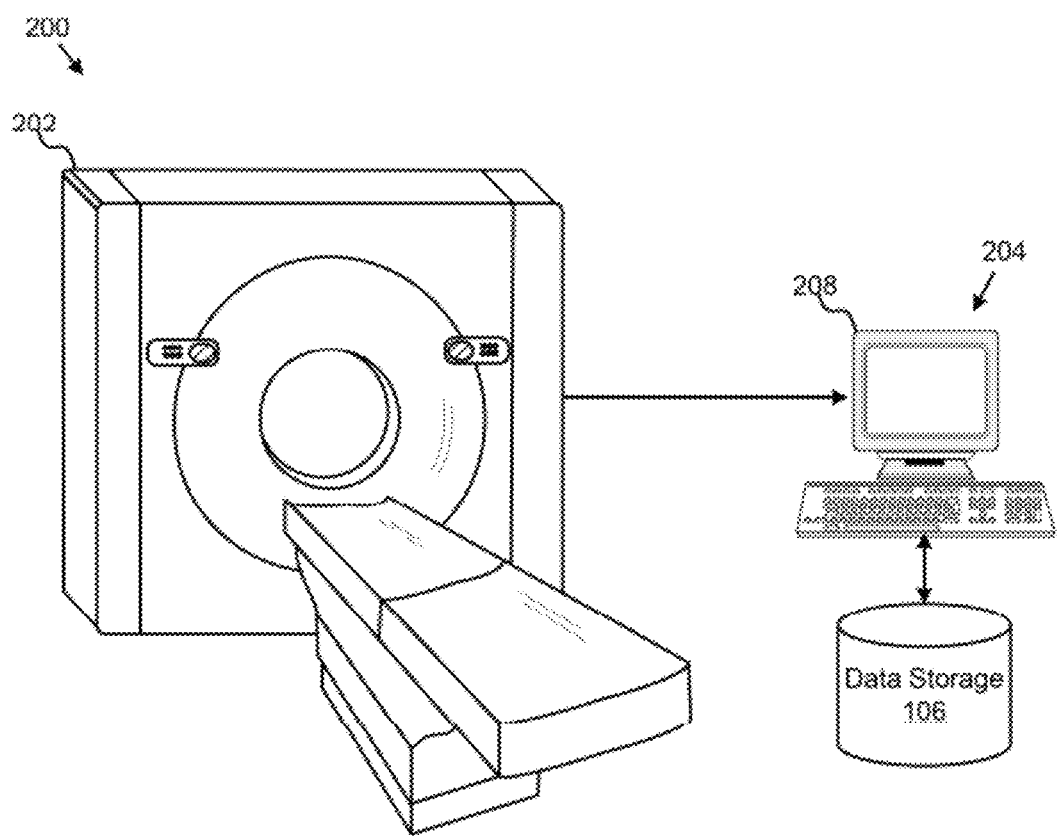
FIG. 2 is a schematic diagram of another embodiment of a system for non-convex prior image constrained compressed sensing.

FIG. 2 is a schematic diagram of another embodiment of a system 200 for non-convex prior image constrained compressed sensing. In this embodiment, the image acquisition device 102 comprises a CT scanner 202. Alternatively, the image acquisition device 102 may include an MRI scanner. One of ordinary skill in the art will recognize additional image acquisition devices 102 that may be suitable for use in the present systems 100 and methods. In a further embodiment, the system 100 may include an image display device 208, coupled to at least one of the data storage device 106 and the data processing device 204, configured to display the output image.

FIG. 3 is a schematic block diagram of one embodiment of a computer device 204 suitable for use in a system 100, 200 for non-convex prior image constrained compressed sensing. The central processing unit (CPU) 302 is coupled to the system bus 304. The CPU 302 may be a general purpose CPU or microprocessor. The present embodiments are not restricted by the architecture of the CPU 302, so long as the CPU 302 supports the modules and operations as described herein. The CPU 302 may execute the various logical instructions according to the present embodiments. For example, the CPU 302 may execute machine-level instructions according to the exemplary operations described below with reference to FIGS. 4-5 and 7-8.

The computer system 204 also may include Random Access Memory (RAM) 308, which may be SRAM, DRAM, SDRAM, or the like. The computer system 204 may utilize RAM 308 to store the various data structures used by a software application configured to non-convex prior image constrained compressed sensing. The computer system 204 may also include Read Only Memory (ROM) 306 which may be PROM, EPROM, EEPROM, optical storage, or the like. The ROM may store configuration information for booting the computer system 204. The RAM 308 and the ROM 306 hold user and system 100 data.

The computer system 204 may also include an input/output (I/O) adapter 310, a communications adapter 314, a user interface adapter 316, and a display adapter 322. The I/O adapter 310 and/or the user interface adapter 316 may, in certain embodiments, enable a user to interact with the computer system 204 in order to input information for setting the predetermined stopping criteria. In a further embodiment, the display adapter 322 may display a graphical user interface associated with a software or web-based application for non-convex prior image constrained compressed sensing. Additionally, the display adapter 322 may render the output image for display on a display device 208.

The I/O adapter 310 may connect to one or more storage devices 312, such as one or more of a hard drive, a Compact Disk (CD) drive, a floppy disk drive, or a tape drive, to the computer system 204. The communications adapter 314 may be adapted to couple the computer system 204 to the network 106, which may be one or more of a LAN and/or WAN, and/or the Internet. The user interface adapter 316 couples user input devices, such as a keyboard 320 and a pointing device 318, to the computer system 204. The display adapter 322 may be driven by the CPU 302 to control the display on the display device 208.

The present embodiments are not limited to the architecture of system 204. Rather, the computer system 204 is provided as an example of one type of computing device that may be adapted to perform the functions of a data processing device 104, 204. For example, any suitable processor-based device may be utilized, including, without limitation, personal data assistants (PDAs), computer game consoles, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

In a particular embodiment, the input adapter 310 may receive a plurality of image datasets, each image dataset acquired at one of a plurality of time points by an image acquisition device 102. The memory device 308 may store the plurality of image datasets. In one embodiment, the processor 302 may select a first dataset corresponding to a first time point, select a first group of datasets corresponding to a range of time points that includes the first time point, and generate an output image corresponding to the first time point according to a non-convex prior image constrained compressed sensing algorithm performed on the first data using information from the first group of datasets.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
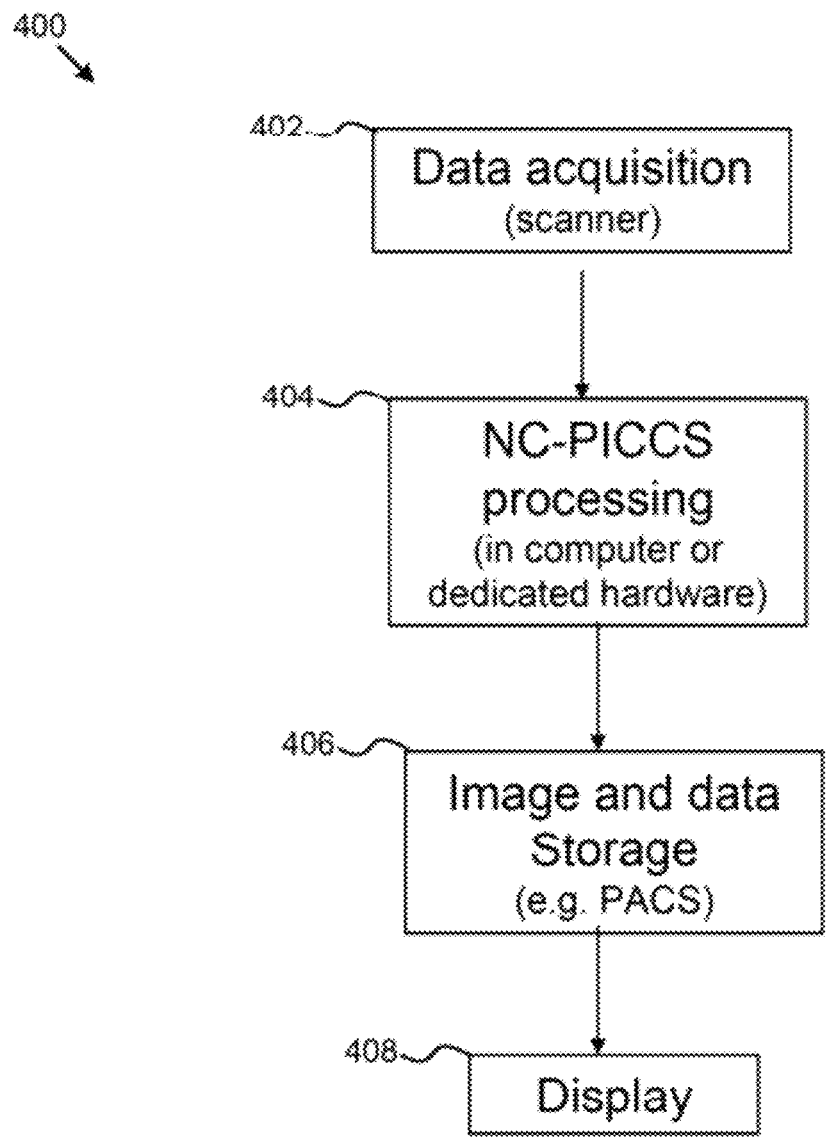
FIG. 4 is a flow chart diagram illustrating one embodiment of a method for image processing according to a non-convex prior image constrained compressed sensing algorithm.

FIG. 4 is a flow chart diagram illustrating one embodiment of a method 400 for image processing according to a non-convex prior image constrained compressed sensing algorithm. In one embodiment, the method includes data acquisition 402 using, e.g., an image scanner. The method 400 may also include processing 404 the data according to an NC-PICCS processing algorithm. The processing 404 step may be performed in a computer 204 or other dedicated hardware. The method 400 may also include image and data storage 406. For example, the data may be stored in a data storage device 106. Finally, the method 400 may include displaying 408 a resultant image.

Figure 5:
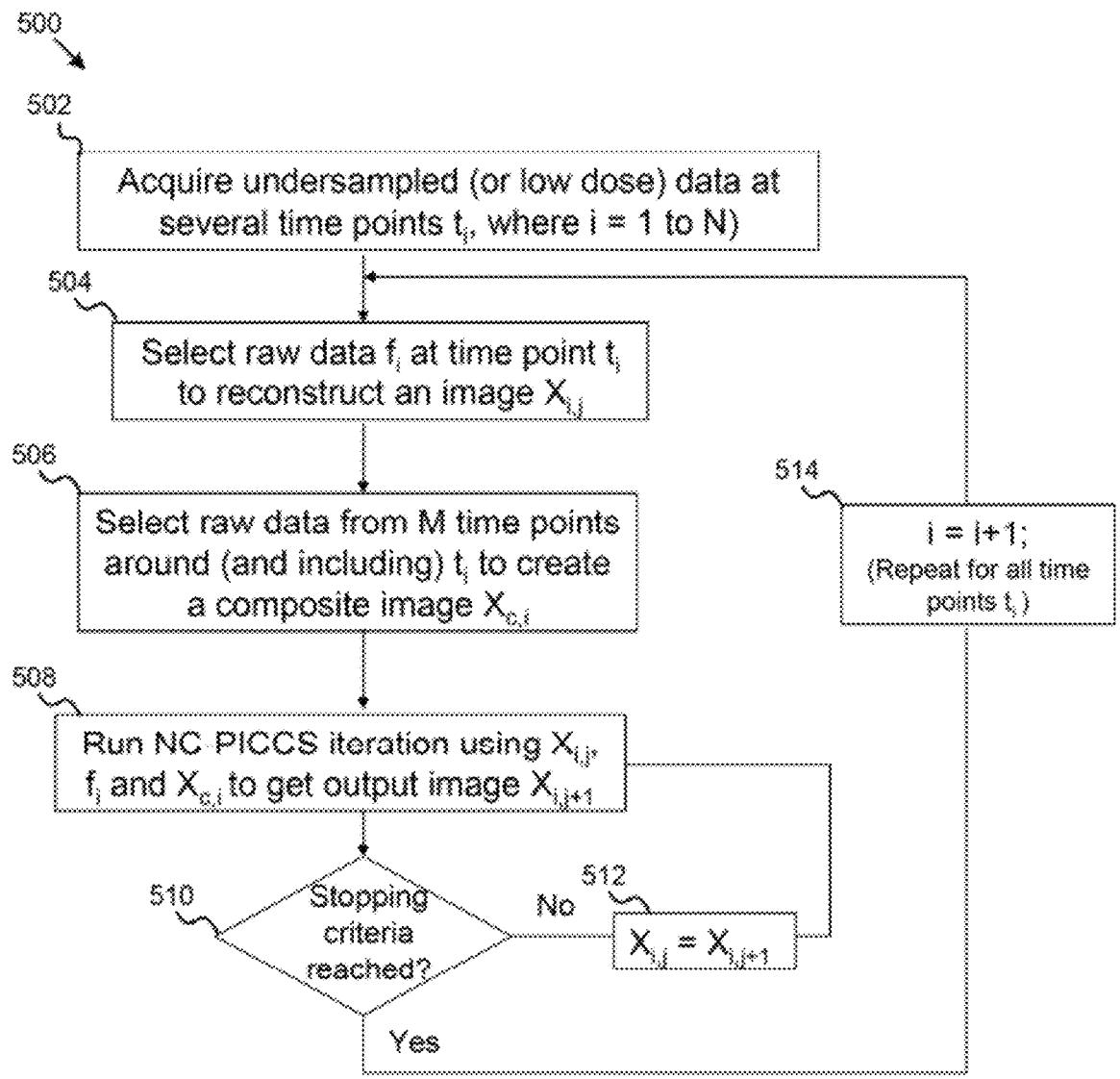
FIG. 5 is a flow chart diagram illustrating another embodiment of a method for image processing according to a non-convex prior image constrained compressed sensing.

FIG. 5 is a flow chart diagram illustrating another embodiment of a method 500 for image reconstruction according to a non-convex prior image constrained compressed sensing. In this embodiment, the method 500 includes acquiring 502 undersampled (or low dose) data at several time points $t_i$, where i=1 to N. The method may also include selecting 504 raw data $f_i$ at time point $t_i$ to reconstruct an image $X_{i,j}$. Additionally, the method 500 includes selecting 506 raw data from M time points around (and including) $t_i$ to create a composite image $X_{c,i}$. Then, the method 500 includes running 508 an iteration of a non-convex prior image constrained compressed sensing algorithm using $X_{i,j}$, $f_i$, and $X_{c,i}$ to generate an output image $X_{i,j+1}$. If, at determination 510, a predetermined stopping criteria has been reached, another time point is selected 514 and the process repeats. For example, a counter may be incremented so that i=i+1, and this is repeated for all time points $t_i$. If, however, at determination 510, the stopping criteria has not been reached, then the output image $X_{i,j+1}$ becomes 512 the new image $X_i$ and the non-convex prior image constrained compressed sensing algorithm is repeated 508 on the new image $X_{i,j}$.

Figure 6:
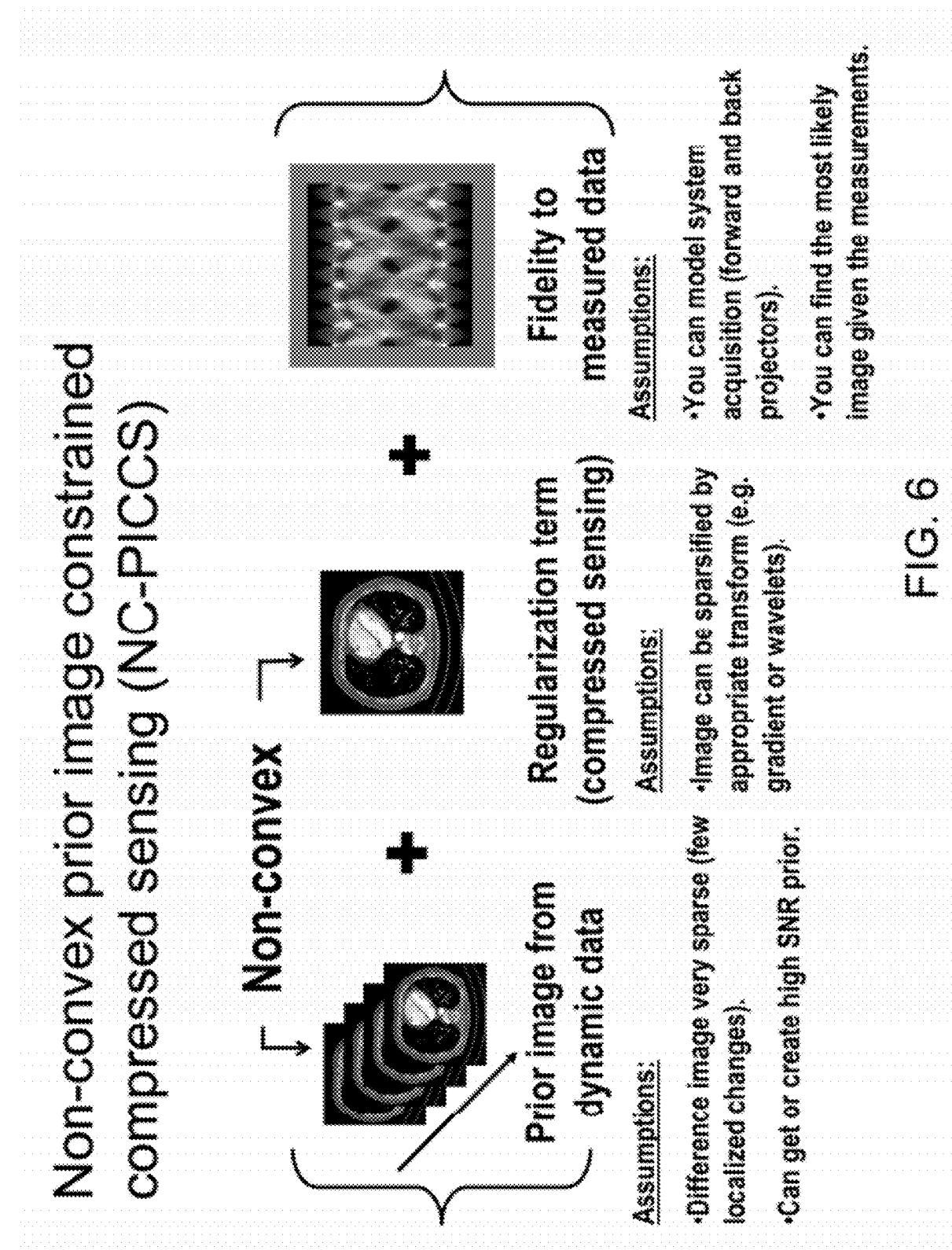
FIG. 6 is a conceptual diagram illustrating one embodiment of a method for image processing according to a non-convex prior image constrained compressed sensing.

FIG. 6 is a conceptual diagram illustrating the various methods for image processing according to a non-convex prior image constrained compressed sensing (NC-PICCS). The NC-PICCS method extends the PICCS algorithm by replacing all $l_1$-norm terms with non-convex priors $\rho(\bullet)$ to increase the undersampling potential. The general NC-PICCS objective function is written as follows:

$$\min_x [\alpha \cdot \rho(|\Psi_1(x - x_{pr})|) + (1-\alpha) \cdot \rho(|\Psi_2 x|)] \text{ s.t. } \Phi x = f \quad \text{Eq. 1}$$

where $\Psi_1$ and $\Psi_2$ represent a signal transformation to seek sparsity (i.e. the spatial gradient or the wavelet transform), $x_{pr}$ is a prior composite image, $\Phi$ is the forward projection operator, f is the measured data (i.e. sinogram), x is the signal to reconstruct, and a balances sparsity and prior image fidelity in the generated image estimate. In a special case, $\rho(\bullet)$ is the $l_p$-functional (or $l_p$-quasinorm), i.e. $\|x\|_p = (\Sigma_i |x_i| x_i^p|)^{1/p}$ and $0<p<1$, to yield a non-convex objective function, or $p \geq 1$ to yield a convex objective function. The NC-PICCS algorithm objective function using the functional may be expressed as follows:

$$\min_x \{\alpha \|\Psi_1(x - x_{pr})\|_p^p + (1-\alpha)\|\Psi_2 x\|_p^p\} \text{ s.t. } \Phi x = f \quad \text{Eq. 2}$$

In one embodiment, setting p=1 generates the standard PICCS model. As with standard non-convex CS methods, only local optima of Eq. 2 are guaranteed achievable for p<1.

To ease the generation of a (locally) optimal image estimate, a numerical approach to solving the model may be employed. For example, the unconstrained variant of Eq. 2 may be minimized, namely $$J(x, \sigma, \lambda) = \sum_\Omega [\rho(|\Psi_1(x - x_p)|, \sigma) + \rho(|\Psi_2 x|, \sigma)] + \frac{\lambda}{2}\|\Phi x - f\|_2^2 \quad \text{Eq. 3}$$

where $\lambda$ is a non-negative regularization parameter. In an alternative embodiment, the $\sigma$ factor may be omitted. Notice that as $\lambda \to \infty$, exact data fidelity as in Eq. 1 may be asymptotically enforced. Practically, for noisy data, inexact fidelity with an appropriate $\lambda$ may give better results than exact fidelity to the measure data. Differentiating Eq. 3 yields $$L(x) = \alpha\Psi_1^*\Lambda(x-x_{pr})\Psi_1(x-x_{pr}) + (1-\alpha)\Psi_2^*\Lambda(x)\Psi_2 x + \lambda\Phi^*\Phi x - \lambda\Phi^*f \quad \text{Eq. 4}$$

where elements of the diagonal matrix, $\Lambda$, are given by $$\Lambda(y)_{(i,i)} = \frac{\partial \rho(y_i)}{\partial |y_i|}$$

Locally optimal solutions of Eq. 3 then satisfy L(x)=0. To find these signals, the following quasi-Newton iteration may be used:

$$x_{t+1} = x_t - B^{-1}(x_t)L(x_t) \quad \text{Eq. 5}$$

where, $B(x) = \alpha\Psi_1^*\Lambda(x-x_{pr})\Psi_1 + (1-\alpha)\Psi_2^*\Lambda(x)\Psi_2 + \lambda\Phi^*\Phi$.

Figure 7:
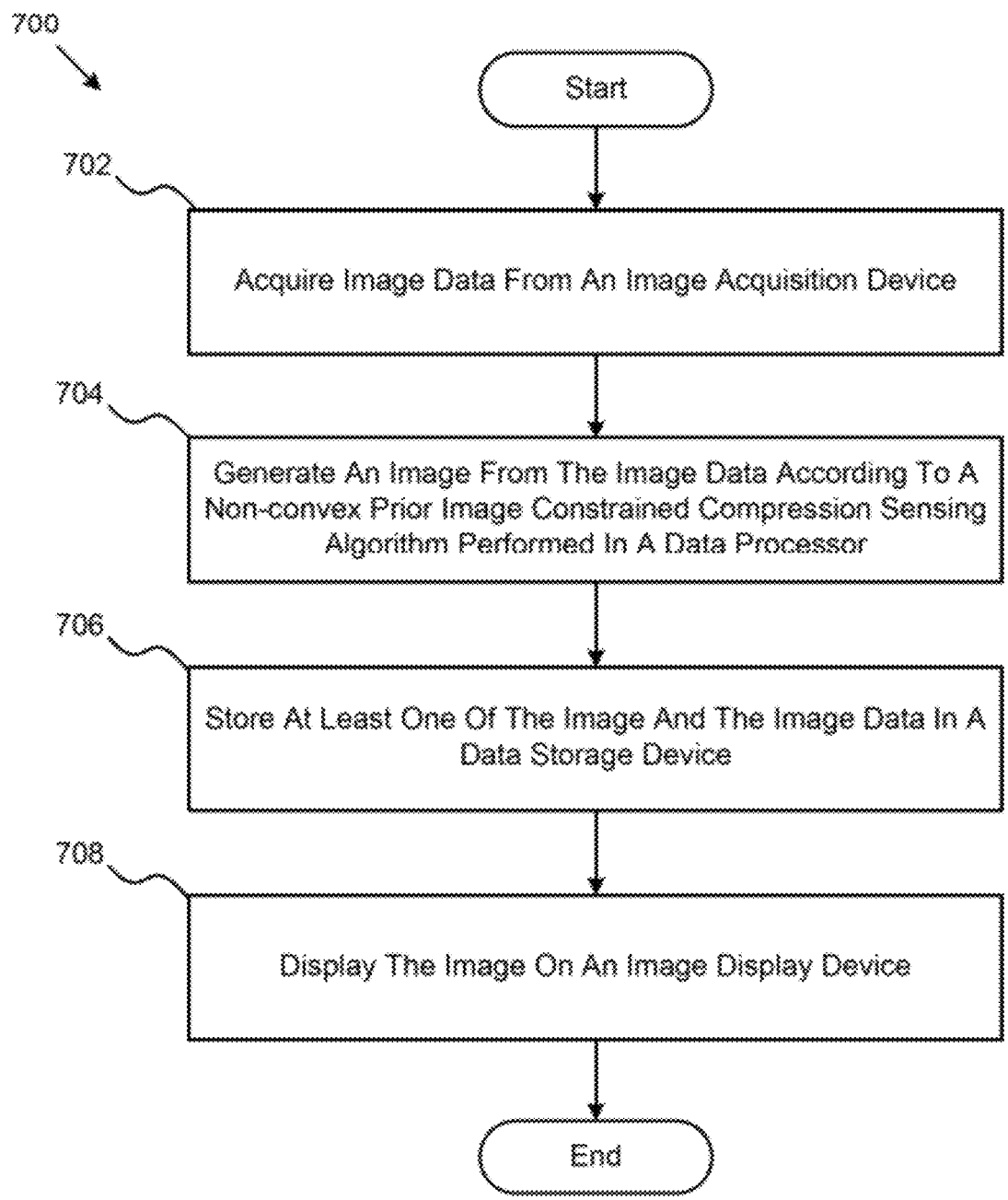
FIG. 7 is a flow chart diagram illustrating another embodiment of a method for image processing according to a non-convex prior image constrained compressed sensing.

FIG. 7 is a flow chart diagram illustrating another embodiment of a method 700 for image processing according to a non-convex prior image constrained compressed sensing. In one embodiment, the method 700 includes acquiring 702 image data from an image acquisition device 102, generating 704 an image from the image data according to a non-convex prior image constrained compressed sensing algorithm performed in a data processor 302, storing 706 at least one of the image and the image data in a data storage device 106, and displaying 708 the image on an image display device 108.

Figure 8:
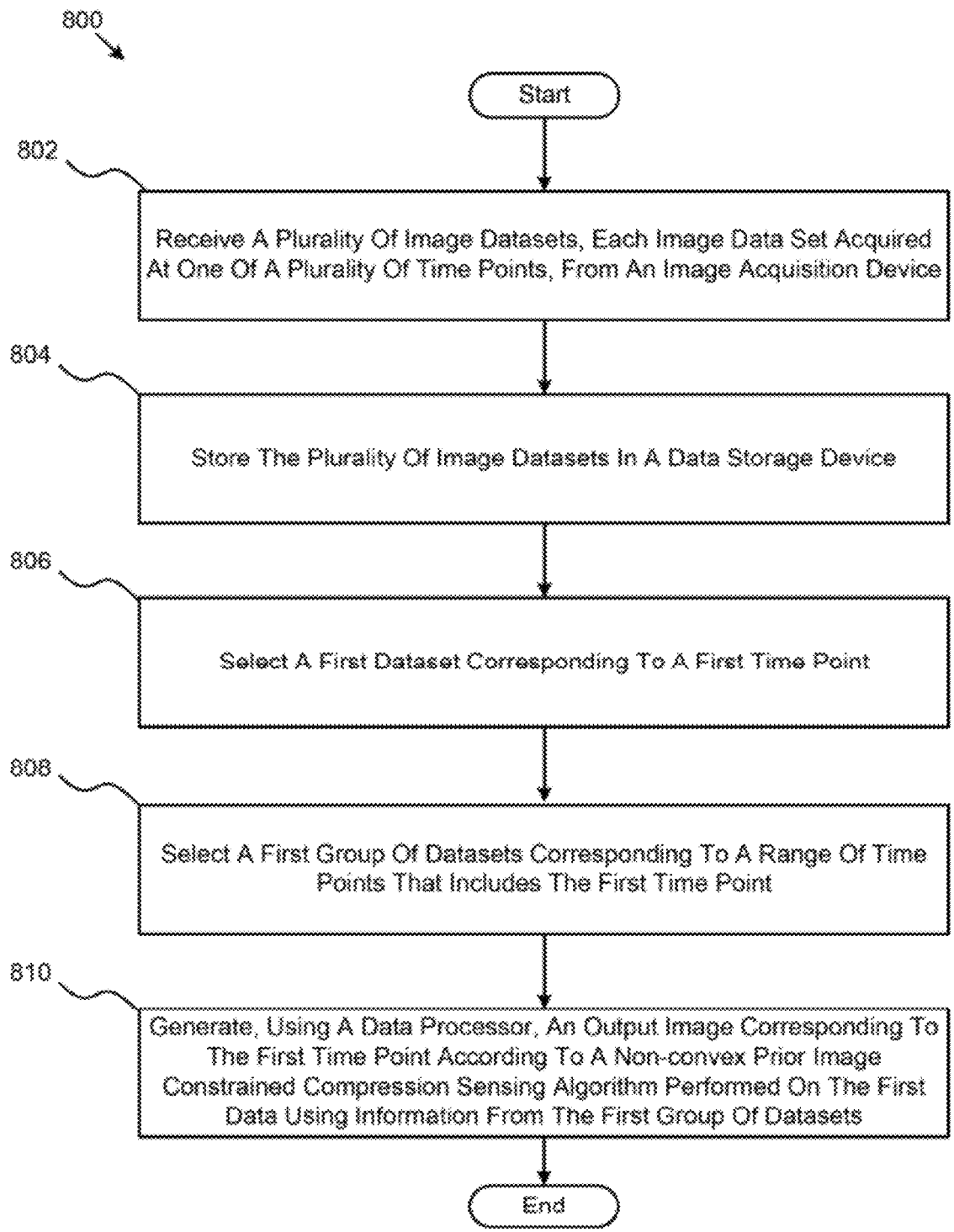
FIG. 8 is a flow chart diagram illustrating yet another embodiment of a method for image processing according to a non-convex prior image constrained compressed sensing.

FIG. 8 is a flow chart diagram illustrating yet another embodiment of a method for image processing according to a non-convex prior image constrained compressed sensing. In another embodiment, the method 800 includes receiving 802 a plurality of image datasets, each image dataset acquired at one of a plurality of time points, from an image acquisition device 102. This embodiment may also include storing 804 the plurality of image datasets in a data storage device 106. Additionally, the method 800 may include selecting 806 a first dataset corresponding to a first time point, and selecting 808 a first group of datasets corresponding to a range of time points that includes the first time point. The method 800 may also include generating 810, using a data processor 302, an output image corresponding to the first time point according to anon-convex prior image constrained compressed sensing algorithm performed on the first data using information from the first group of datasets.

In a further embodiment, the method 800 includes storing the output image in a data storage device 106. Additionally, the method may include displaying the image on an image display device 108. In a particular embodiment, the first dataset corresponds to a first image and the first group of datasets corresponds to a first composite image.

In one embodiment, generating 810 the output image includes computing a gradient in response to the first dataset and the first group of datasets, the gradient indicating a direction for adjusting the first dataset. For example, computing the gradient may include calculating, using the data processor 302, a result of $L(x) = \alpha\Psi_1^*\Lambda(x-x_{pr})\Psi_1(x-x_{pr}) + (1-\alpha(\Psi_2^*\Lambda(x)\Psi_2 x + \lambda\Phi^*\Phi x - \lambda\Phi^*f$ in response to the first dataset and the first group of datasets. Additionally, generating 810 the output image may also include calculating, using a data processor 302, a result of the function $B(x) = \alpha\Psi_1^*\Lambda(x-x_{pr})\Psi_1 + (1-\alpha)\Psi_2^*\Lambda(x)\Psi_2 + \lambda\Phi^*\Phi$ in response to the first dataset and the first group of datasets. In a further embodiment, generating 810 the output image includes calculating, using the data processor 302, a result of the function $x_{t+1} = x_t - B^{-1}(x_t)L(x_t)$.

In one embodiment, the non-convex prior image constrained compressed sensing algorithm may run iteratively until a predetermined stopping criteria is reached. For example, the predetermined stopping criteria may include a predetermined range of results of the function $L(x) = \alpha\Psi_1^*\Lambda(x-x_{pr})\Psi_1(x-x_{pr}) + (1-\alpha)\Psi_2^*\Lambda(x)\Psi_2 x + \lambda\Phi^*\Phi x - \lambda\Phi^*f$, the predetermined range of results centered about a value of zero.

Alternatively, the predetermined stopping criteria may be a preselected number of calculation iterations. In the iterative embodiment, the method 800 may also include selecting a second dataset corresponding to a second time point in response to a determination that the predetermined stopping criteria was reached for the first dataset, selecting a second group of datasets corresponding to a range of time points that includes the second time point, and generating, using the data processor 302, an output image corresponding to the second time point according to the non-convex prior image constrained compressed sensing algorithm performed on the second data using information from the second group of datasets.

The method 800 may also include acquiring the plurality of image datasets with an image acquisition device 102. In particular, the image acquisition device 102 may be a CT scanner 202, an MRI Scanner, or other types of image capture devices including video cameras, radar scanners, RF imaging devices, and ultrasound devices.

A tangible computer program product may also be configured according to the method 800 of FIG. 8. In a particular embodiment, the tangible computer program product may include computer readable code that may be executed by, e.g., computer system 204. When executed by computer system 204, the code may cause the computer 204 to perform various operations. For example, the operations may include receiving 802 a plurality of image datasets, each image dataset acquired at one of a plurality of time points, storing 804 the plurality of image datasets, selecting 806 a first dataset corresponding to a first time point, selecting 808 a first group of datasets corresponding to a range of time points that includes the first time point, and generating 810 an output image corresponding to the first time point according to a non-convex prior image constrained compressed sensing algorithm performed on the first data using information from the first group of datasets.

In a further embodiment, the operations may include storing the output image in data storage. The device 106 operations may also include displaying the image.

In one embodiment, the first dataset corresponds to a first image and the first group of datasets corresponds to a first composite image. Additionally, generating the output image may include computing a gradient in response to the first dataset and the first group of datasets, the gradient indicating a direction for adjusting the first dataset. For example, computing the gradient may include calculating $L(x)=\alpha \Psi_1^* \Lambda(x-x_{pr})\Psi_1(x-x_{pr})+(1-\alpha)\Psi_2^*\Lambda(x)\Psi_2 x+\lambda\Phi^*\Phi x-\lambda\Phi^* f$ in response to the first dataset (first image) and the first group of datasets (first composite image). Generating the output image may also include calculating a result of the function $B(x)=\alpha\Psi_1^*\Lambda(x-x_{pr})\Psi_1+(1-\alpha)\Psi_2^*\Lambda(x)\Psi_2+\lambda\Phi^*\Phi$ in response to the first dataset and the first group of datasets. Additionally, generating the output image may include calculating a result of the function $x_{t+1}=x_t-B^{-1}(x_t)L(x_t)$.

In a further embodiment, the operations may run the non-convex prior image constrained compressed sensing algorithm iteratively until a predetermined stopping criteria is reached. For example, the predetermined stopping criteria may include a predetermined range of results of the function $L(x)=\alpha\Psi_1^*\Lambda(x-x_{pr})\Psi_1(x-x_{pr})+(1-\alpha)\Psi_2^*\Lambda(x)\Psi_2 x+\lambda\Phi^*\Phi x-\lambda\Phi^* f$, the predetermined range of results centered about a value of zero. Alternatively, the predetermined stopping criteria may be a preselected number of calculation iterations. In such embodiments, the operations may also include selecting a second dataset corresponding to a second time point in response to a determination that the predetermined stopping criteria was reached for the first dataset, selecting a second group of datasets corresponding to a range of time points that includes the second time point, and generating an output image corresponding to the second time point according to the non-convex prior image constrained compressed sensing algorithm performed on the second data using information from the second group of datasets.

The operations may also include acquiring the plurality of image datasets with an image acquisition device 102 coupled to the computer 204. For example, the image acquisition device 102 may be a CT scanner 202.

Figure 9:
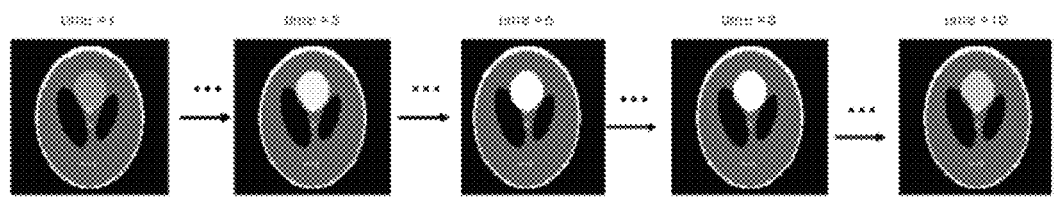
FIG. 9 is an example of the process of following the passage of the contrast agent (uppermost ellipse) to create time attenuation curves for perfusion studies analysis.

Dynamic data in CT may be acquired to follow the passage of an indicator contrast agent, see FIG. 9. For both PICCS and NC-PICCS, different methods are possible to create the prior image: a full dose acquisition, a composite image from several undersampled acquisitions, or the composition of an image using various low dose acquisitions. Such methods may operate on data with spatio-temporal correlations. FIG. 9 is an example of the process of following the passage of the contrast agent (uppermost ellipse) to create time attenuation curves for perfusion studies analysis. FIG. 9 shows a sequence of images based on the Shepp-Logan phantom, but with the uppermost ellipse changing intensity at different time points and hence simulating the passage of a contrast agent. The model for varying the intensity of the uppermost ellipse followed a gamma-variate function and was composed of twenty time points. The average image from the sequence was used as the prior image for both PICCS and NC-PICCS.

For proof of concept of the present methods, a time varying contrast object was simulated within the Shepp-Logan phantom, by varying the intensity of the uppermost ellipse. Using the information from all time points a composite (prior) image $x_{pr}$ was created. A forward projection operation (22, 14, 12, 9, 6 and 4 projections) was then retrospectively simulated.

Four compressed sensing methods were compared: standard compressed sensing with l1-norm (CS-l1), homotopic l0-minimization (CS-l0), prior image constrained compressed sensing (PICCS) and the proposed NC-PICCS with homotopic continuation. For the purposes of comparison $\lambda=500$ and $\alpha=0.7$ may be fixed for the PICCS and NC-PICCS algorithms.

Figure 10:
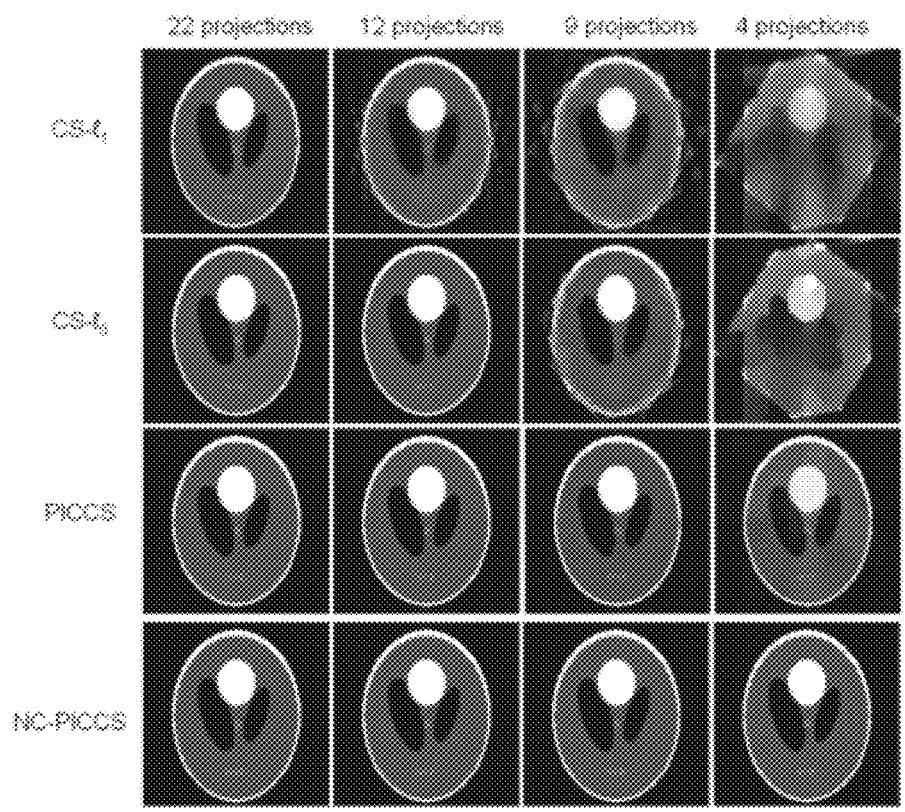
FIG. 10 is an illustration of a comparison of performance of four methods for compressed sensing CT: standard compressed sensing with l1-norm (CS-l1), homotopic approximation to l0-quasinorm (CS-l0), prior image constrained compressed sensing (PICCS) and non-convex PICCS by solving a homotopic approximation to l0-quasinorm. All methods used $\lambda=500$ and for the PICCS and NC-PICCS $\alpha=0.7$.

FIG. 10 demonstrates that the present methods allow reconstruction of the images with fewer projections than convex methods based on l1. While this synthetic data is an admitted simplification of real-world imaging, it is useful to demonstrate the benefit of the non-convex methods over the convex methods at extreme undersampling limits. When there is no prior image information, an image may be reconstructed with just 12 projections with the homotopic l0 minimization method. This can potentially be beneficial to further reduce dose by compressed sensing methods in regular CT scanning.

Figure 11:
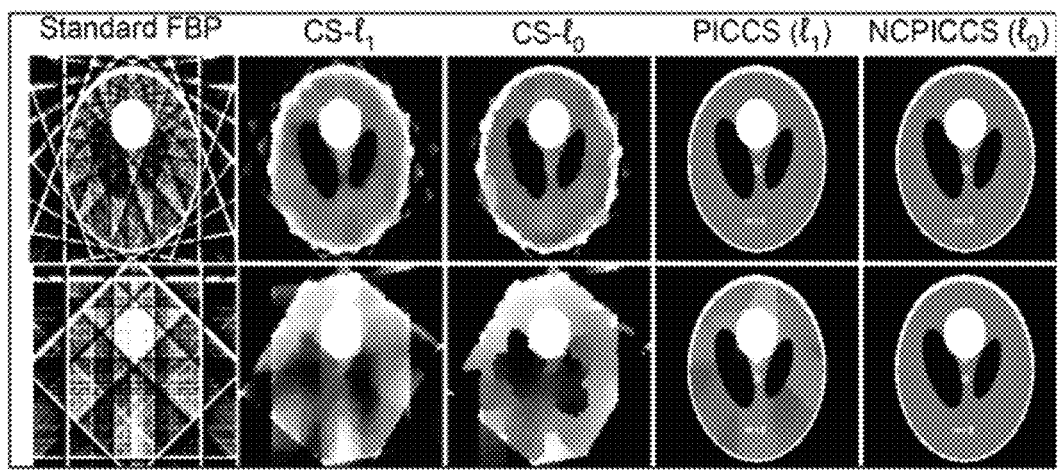
FIG. 11 is a Noise-free Shepp-Logan phantom for illustrating a comparison of performance of four methods for CS-CT and conventional filtered backprojection (FBP): PICCS and NC-PICCS use prior image information (top row nine projections, lower row four projections)

FIG. 10 also shows that for the data used it was possible to exactly reconstruct the Shepp-Logan phantom from only 4 projections when a prior image and the NC-PICCS method was used. While the standard PICCS method was able to reconstruct the phantom image from only six projections, it began to fail at higher sampling rates than the present NC-PICCS methods. FIG. 11 compares absolute errors (pixel by pixel) using PICCS (a-d) and NC-PICCS (e-h) by only using only six (a, b, e, f) and four projections (c, d, g, h). FIG. 11 (b, f) show the error image for 6 projections with a window level from 0 to 0.01 while FIG. 11 (d, h) show the error image for 4 projections with a window level from 0 to 0.025. One of ordinary skill in the art will recognize that the NC-PICCS error is significantly lower.

FIG. 10 is an illustration of a comparison of performance of four methods for compressed sensing CT at different levels of data undersampling: standard compressed sensing with l1-norm (CS-l1), homotopic approximation to l0-quasinorm (CS-l0), prior image constrained compressed sensing (PICCS) and non-convex PICCS by solving a homotopic approximation to l0-quasinorm. All methods used $\lambda=500$ and for the PICCS and NC-PICCS $\alpha=0.7$.

Figure 12:
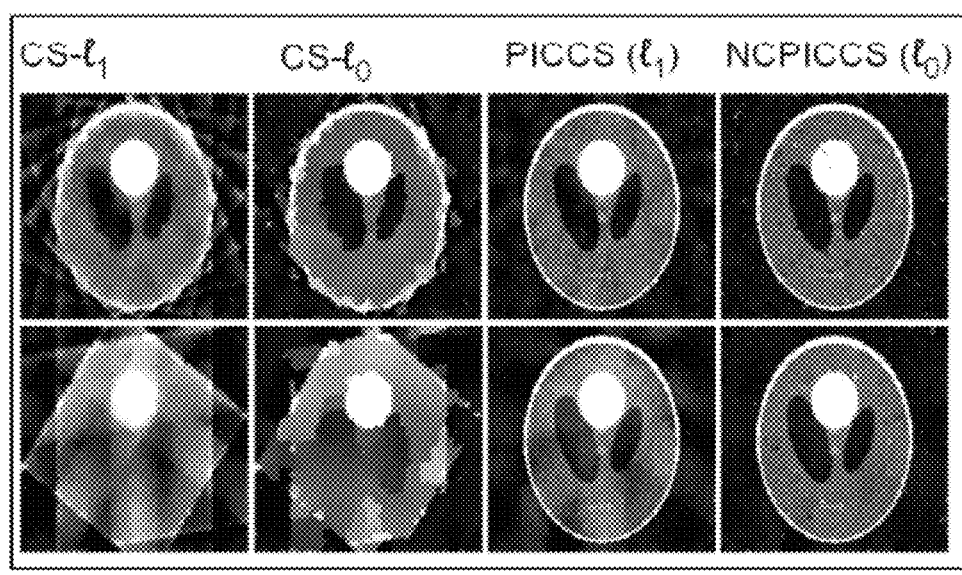
FIG. 12 is an illustration of a Shepp-Logan phantom with added noise for illustrating a comparison of performance of four methods for CS-CT and conventional filtered backprojection (FBP): PICCS and NC-PICCS use prior image information (top row nine projections, lower row four projections)
Figure 13:
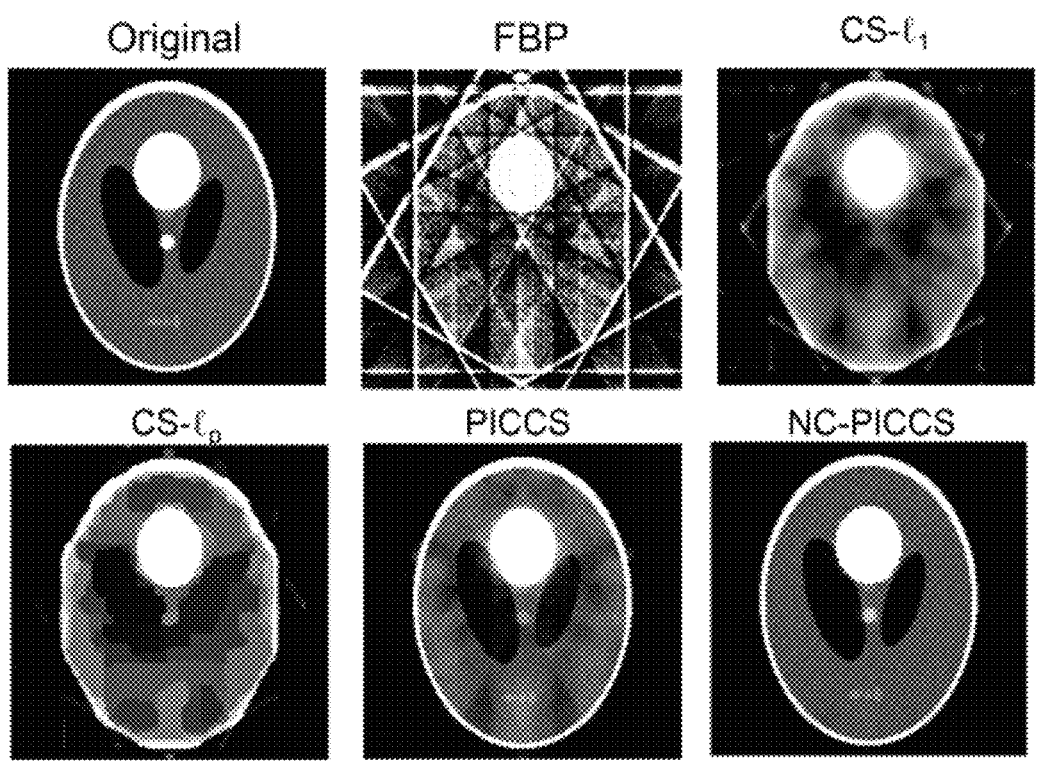
FIG. 13 illustrates a comparison between PICCS (a-d) and NC-PICCS (e-h) by only using only six (a, b, e, f) and four projections (c, d, g, h)

FIG. 12 is a noise-free Shepp-Logan phantom for illustrating a comparison of performance of four methods for CS-CT with the conventional filtered backprojection (FBP). PICCS and NC-PICCS use prior image information (top row nine projections, lower row four projections). Convex and non-convex methods were compared, either using or not, prior image information. FIG. 12 shows that NC-PICCS allows reconstructions with as few as 4 projections when prior information is used, superior to PICCS and far superior to CS without prior information. All methods are superior to conventional filtered backprojection. Identical results were obtained at other time points. FIG. 13 demonstrates that the results hold when Poisson-like noise is added to the simulated phantom time-series, ($1\times10^4$ photons per view). Specifically, FIG. 13 is an illustration of a Shepp-Logan phantom with added noise, at only 6 projections, for illustrating a comparison of performance of four methods for CS-CT and conventional filtered backprojection (FBP): PICCS and NC-PICCS use prior image information, while FBP, CS-L1 or CS-Lp do not. Again, the NC-PICCS method kept a better fidelity to the target image. Both NC-PICCS and PICCS methods appeared to greatly benefit from the prior image information and outperformed their counterparts which did not use prior image information.

Additionally in vivo tests were performed using a previously acquired, animal (pig), renal perfusion dataset consisting of 140 time resolved images. Images were acquired with a DSCT system (Siemens Definition DS) at 80 kVp, 24×1.2 collimation, 7.2 mm slice and a contrast bolus injection rate of 0.5 mL/Kg over 2 seconds, and 160 mAs. Using these datasets the performance of the NC-PICCS method was tested by retrospectively undersampling the acquired dataset by 36, 20, and 10 forward projections. Furthermore, using information from different time points a composite image was created. One of ordinary skill in the art will notice that for the creation of the composite images one has different options: a full dose image, a composite image from the reconstructed undersampled images, or a composite sinogram with complementary projection data from different time points in the acquisition.

In one test, 70 multiscan exposures were acquired with 0.67-second interval, followed by another 70 scans with 2-second interval, bringing the total scanning time to about 3 minutes. From these scans, 17 of them were selected, as representative time-points of the TAC, for experimentation and with no loss in generality (each time-point reconstruction is independent of each other). The first image of the dataset was reconstructed using all available projections, having all the dose, and serving as the high SNR prior image ($x_{pr}$).

Figure 14A:
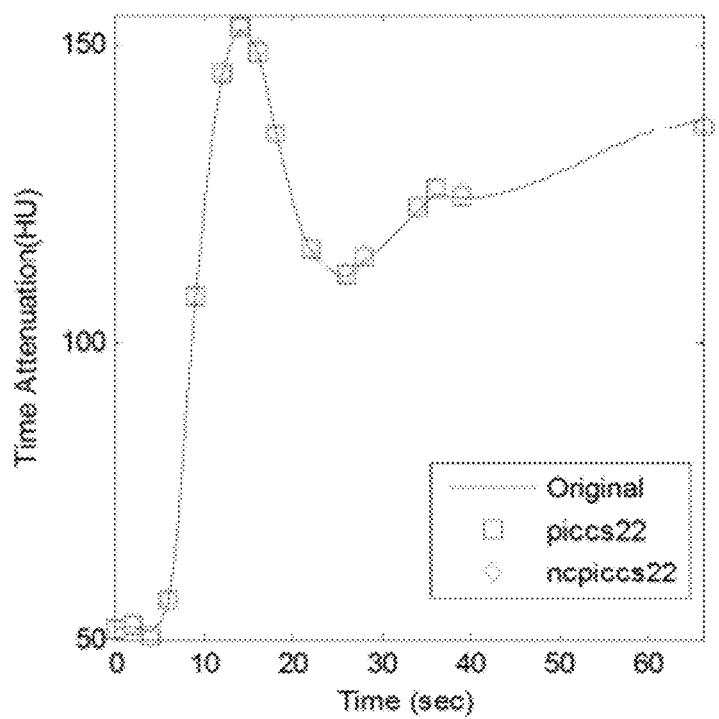
FIG. 14A is a graphical representation of in vivo data illustrated on a time-attenuation curve comparing an original high dose image with an image generated using twenty-two projections of both PICCS and NC-PICCS algorithms.
Figure 14B:
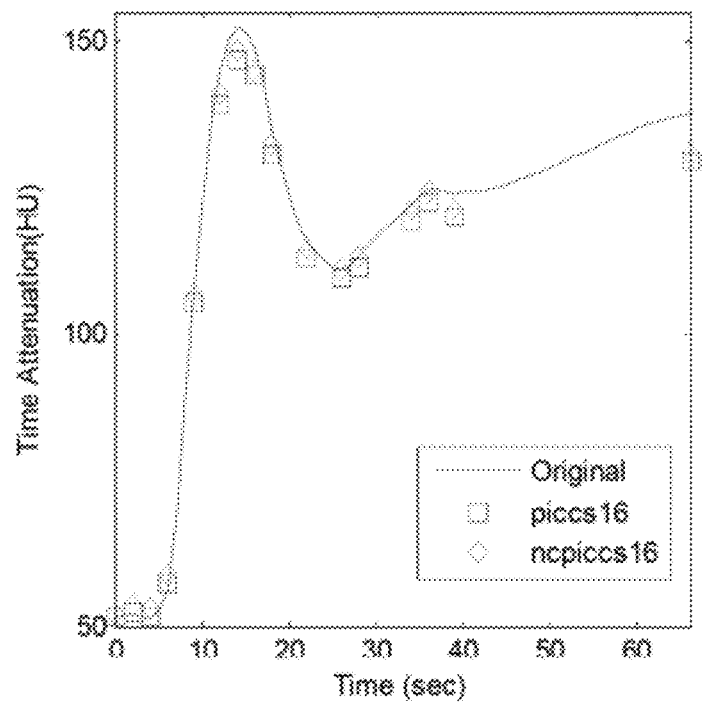
FIG. 14B is a graphical representation of in vivo data illustrated on a time-attenuation curve comparing an original high dose image with an image generated using sixteen projections of both PICCS and NC-PICCS algorithms.

Images were reconstructed using all projections (original data) and using 22 and 16 projections. Time attenuation curves (TACs) were calculated by tracing a manual ROI on the cortex of one of the kidneys and recording the mean CT values. FIG. 14A is a graphical representation of in vivo data illustrated on a time-attenuation curve comparing an original high dose image with an image generated using twenty-two projections of both PICCS and NC-PICCS algorithms. FIG. 14B is a graphical representation of in vivo data illustrated on a time-attenuation curve comparing an original high dose image with an image generated using sixteen projections of both PICCS and NC-PICCS algorithms.

FIG. 14. reveals that both PICCS and NC-PICCS are able to recover the TACs with either 22 or 16 projections, although accuracy starts to decay for the 16 projections case. Furthermore, the results suggest that on real data the difference in accuracy of the perfusion TACs for the convex and non-convex PICCS is small, in contrast to a more significant difference found in the simulated Shepp-Logan phantom experiments, where the NC-PICCS method performed better than PICCS. In spite of providing similar TACs, for higher undersampling cases the quality of images reconstructed with NC-PICCS seem to be less affected by the characteristic streaking artifacts caused by the use of a lower number of projections (FIG. 15).

Figure 15:
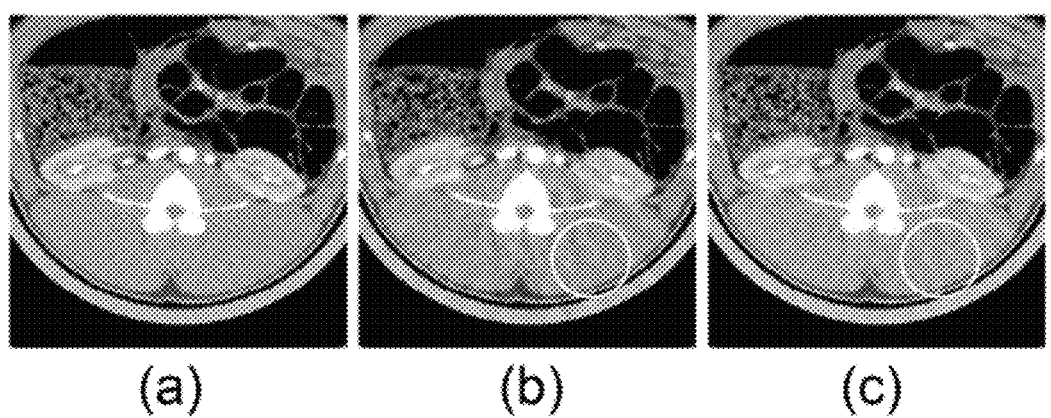
FIG. 15A illustrates a sample reconstructed image for an original image with full projections.
FIG. 15B illustrates a sample reconstructed image for PICCS using twenty-two projections.
FIG. 15C illustrates a sample reconstructed image for NC-PICCS using twenty-two projections.

FIG. 15 illustrates an example of performance using NC-PICCS on the pig data. FIG. 15A illustrates a sample reconstructed image for an original image with full projections. FIG. 15B illustrates a sample reconstructed image for PICCS using twenty-two projections. FIG. 15C illustrates a sample reconstructed image for NC-PICCS using twenty-two projections. Images reconstructed with both methods were successful with little loss of image quality. However, NC-PICCS image provides less artifacts, note surrounded area.

Figure 16A:
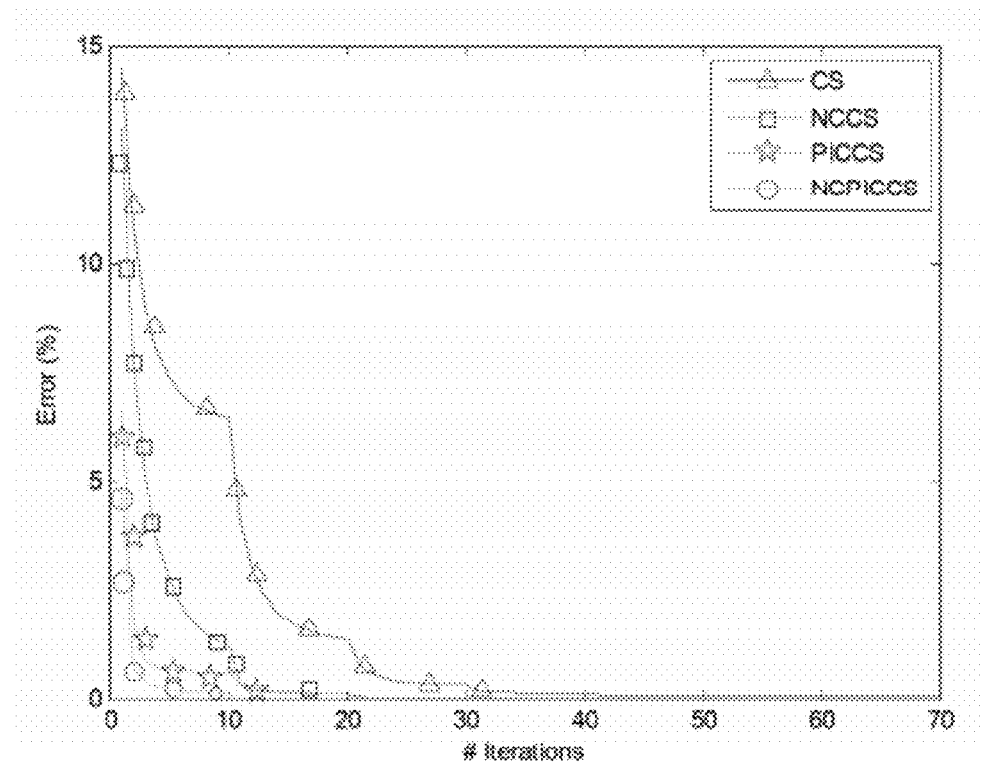
FIGS. 16A and 16B are graphical representations of convergence speed of implemented methods under a quasi-Newton numerical scheme.
Figure 16B:
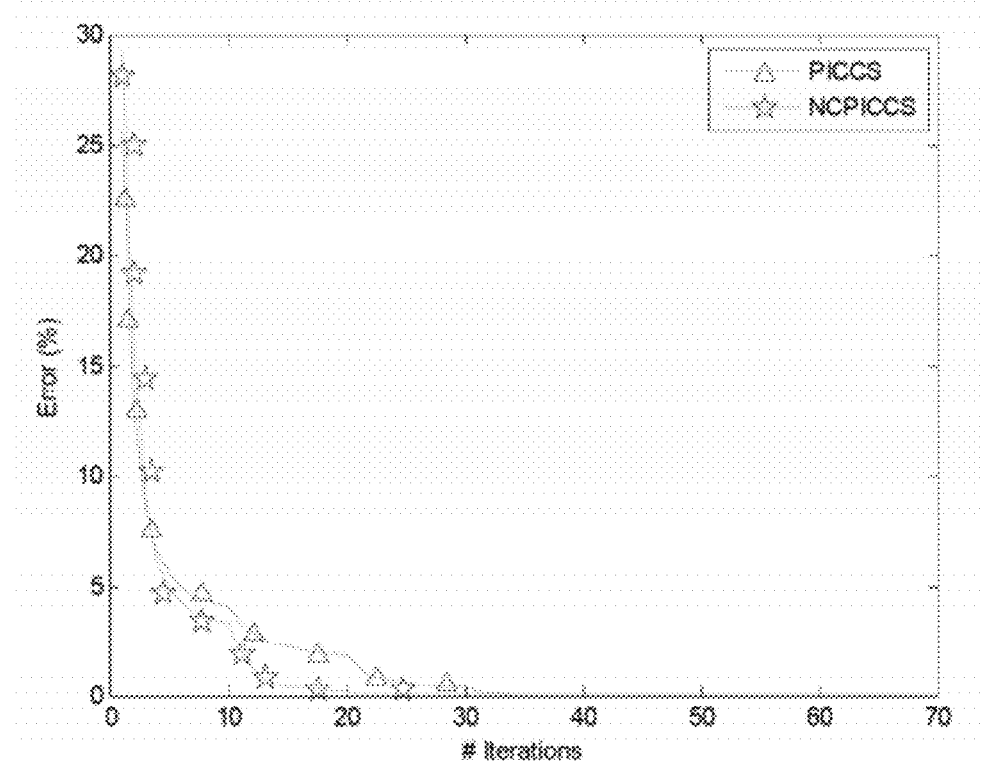

Convergence speed across all compressed sensing methods was compared at several levels of undersampling. For this comparison, the optimal lambda was selected for each method, and the error was computed against the noise-free, Shepp-Logan phantom. The results consistently indicated a faster convergence of non-convex methods compared to their convex counterparts. Furthermore, methods employing the prior image information also converged significantly faster. Since NC-PICCS benefit from prior image information, its convergence speed was best across the four methods compared. For an example, FIG. 16A shows a comparison of convergence speed of all four methods at 20 projections. While all methods are expected to reconstruct the Shepp-Logan phantom (after enough iterations) the convergence speed across methods differs. FIG. 16B show an example when using only 6 projections in which we only expect the PICCS and NCPICCS method recover the image accurately. The NCPICCS method converge in about half the number of iterations that the convex PICCS method.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

EXAMPLES

The undersampling potential, functional information recovery, and solution convergence speed of four compressed sensing (CS) based image reconstruction methods using perfusion CT data are systematically compared: standard l1-based CS, nonconvex CS (NCCS), and l1-based and nonconvex CS including an additional constraint based on a prior image (PICCS and NCPICCS, respectively).

The Shepp-Logan phantom was modified such that its uppermost ellipses changed attenuation through time, simulating both an arterial input function (AIF) and a homogeneous tissue perfusion region. Data was simulated with and without Poisson noise added to the projection data, and subsequently reconstructed with all 4 CS-based methods at four levels of undersampling: 20, 12, 6 and 4 projections. Root mean squared (RMS) error of reconstructed images and recovered time attenuation curves (TACs) were assessed as well as convergence speed. The performance of both PICCS and NCPICCS methods were also evaluated using a kidney perfusion animal experiment data set.

Example 1

Numerical Phantom Simulations

Prior Image Data

The simulations concentrate on dynamic data in PCT, which was acquired to follow the passage of contrast agent. As aforementioned, both PICCS and NCPICCS require a prior image. Common strategies to obtain this prior image include: (1) a background image (first time-point in the data series) obtained using a conventional CT acquisition sampled with a predetermined number x-ray projections (e.g. ~1000 projections) and employing sufficient radiation dose, (2) a composite image coming from a collection of several undersampled acquisitions at different time points, but with complementary angular projections, or (3) an average of various time-point images acquired using a conventional CT acquisition regarding number of projections, but employing a lower radiation dose (e.g. lower mAs) at each time point. For the numerical simulations presented here, it is assumed that an image with sufficient sampling and dose is available, corresponding to the background (before contrast agent arrival) as the prior image. Data with and without Poisson noise added to the projections were simulated. A value of $1\times10^4$ photons per detector element was used to perform the noise addition. Simulations assume ideal conditions (i.e. did not take into account polychromatic spectra, beam hardening, scattering, etc.) and employee parallel beam geometry.

Dynamic PCT Phantom

Figure 17:
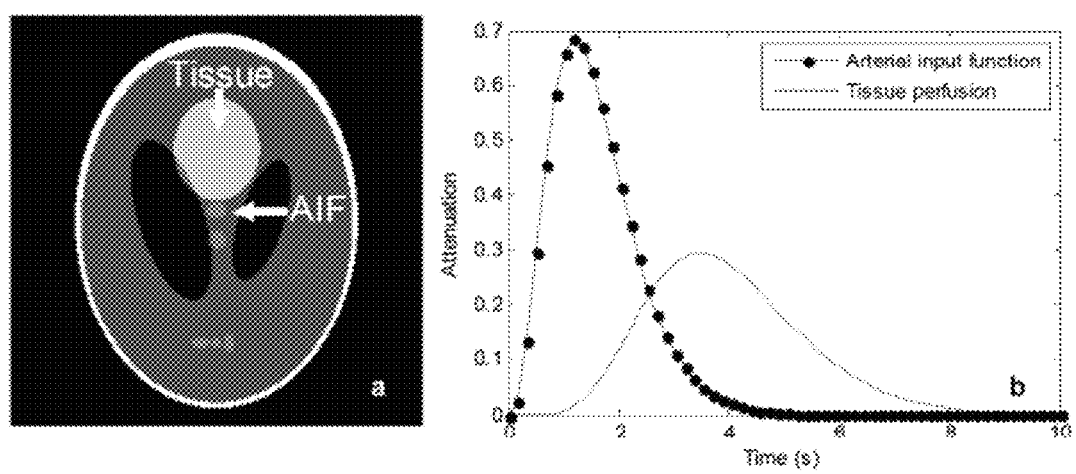
FIG. 17 illustrates a dynamic phantom showing detailed ellipses changing attenuation through time (a) and time density curves of the simulated arterial input function (AIF) and perfused tissue and its time density curves (b)

The Shepp-Logan phantom, with size 256×256, is modified such that the uppermost ellipses change attenuation through time, simulating both an arterial input function (AIF) and a homogeneous tissue perfusion region as shown in FIG. 17, each following a single gamma-variate function of the form:

$$y = a \cdot t^b \cdot \exp\left(-\frac{t}{c}\right) \qquad \text{Eq. 6}$$

where t is the time, and the parameters a, b and c control the amplitude, width and speed of decay of the gamma-variate function. Simulated values were a=8, b=3 and c=2.5 for the AIF, and a=0.05, b=7, c=2 for the tissue perfusion. A total of 20 time points were simulated, with time steps Δt=0.5 s.

Noise-Free Phantom Experiments

The simulated dynamic data was reconstructed using parallel beam geometry, and four levels of undersampling: 4, 6, 12, and 20 projections, at evenly distributed angles. These numbers of projections were selected to illustrate the breaking points at which the different methods were no longer able to accurately reconstruct an image. Each level of undersampling was reconstructed using 4 methods: compressed sensing (CS), nonconvex compressed sensing (NCCS), PICCS and NCPICCS; each condition was obtained by setting the appropriate p and α values in the NCPICCS objective function, Eq. 2 (Table 1). Note that the numerical implementation of PICCS differs from the original algorithm which employs a modified gradient descent approach as in [37]. In all four algorithm conditions, the filtered backprojection (FBP) image was used for initialization.

TABLE 1

Optimum λ selection for each simulated condition.

| Method | Number of projections | Noise Free | Noise added |
|---|---|---|---|
| CS | 20 | 75 | 50 |
| p = 1, α = 0 | 12 | 20 | 50 |
|  | 6 | 20 | 50 |
|  | 4 | 20 | 50 |
| NCCS | 20 | 75 | 50 |
| p = 0.7, α = 0 | 12 | 75 | 50 |
|  | 6 | 20 | 50 |
|  | 4 | 20 | 50 |
| PICCS | 20 | 75 | 50 |
| p = 1, α = 0.7 | 12 | 75 | 50 |
|  | 6 | 50 | 20 |
|  | 4 | 50 | 10 |
| NCPICCS | 20 | 75 | 50 |
| p = 0.7, α = 0.7 | 12 | 75 | 50 |
|  | 6 | 50 | 50 |
|  | 4 | 50 | 50 |

The NCPICCS formulation requires several free parameters to be defined. After empirical evaluation, α is fixed at α=0.7 for both prior image constrained methods (PICCS, NCPICCS), comparable to values previously used with the PICCS[38]. Similarly, p is fixed at p=0.7 for both nonconvex methods (NCCS, NCPICCS) to ease the comparison across methods. The results were found not too sensitive to the exact numbers chosen for the parameters α and p. However, the regularization parameter λ that showed stronger dependence on its selection. To avoid unfair comparisons due to an inconsistent choice of λ, experiments were performed in which the optimal $\lambda_{opt}$ for each of the four methods was selected based on the minimum calculated root mean squared (RMS) error after reconstructing the same data using different λ values (Eq. 3). In other words, the optimal RMS error performance of each algorithm was compared.

Poisson-Noise Added Phantom Experiments

Other than the use of added noise to the projection data, these simulations were similar to the noise-free conditions, including the search of $\lambda_{opt}$ for each of the four methods.

Algorithm Convergence Experiments

The convergence benefits of using either nonconvex functions, prior images, or both are also investigated. For these experiments, $\lambda_{opt}$ is chosen as explained previously. All simulations use the same numerical solver and fixed the total number of iterations.

Results

Figure 19:
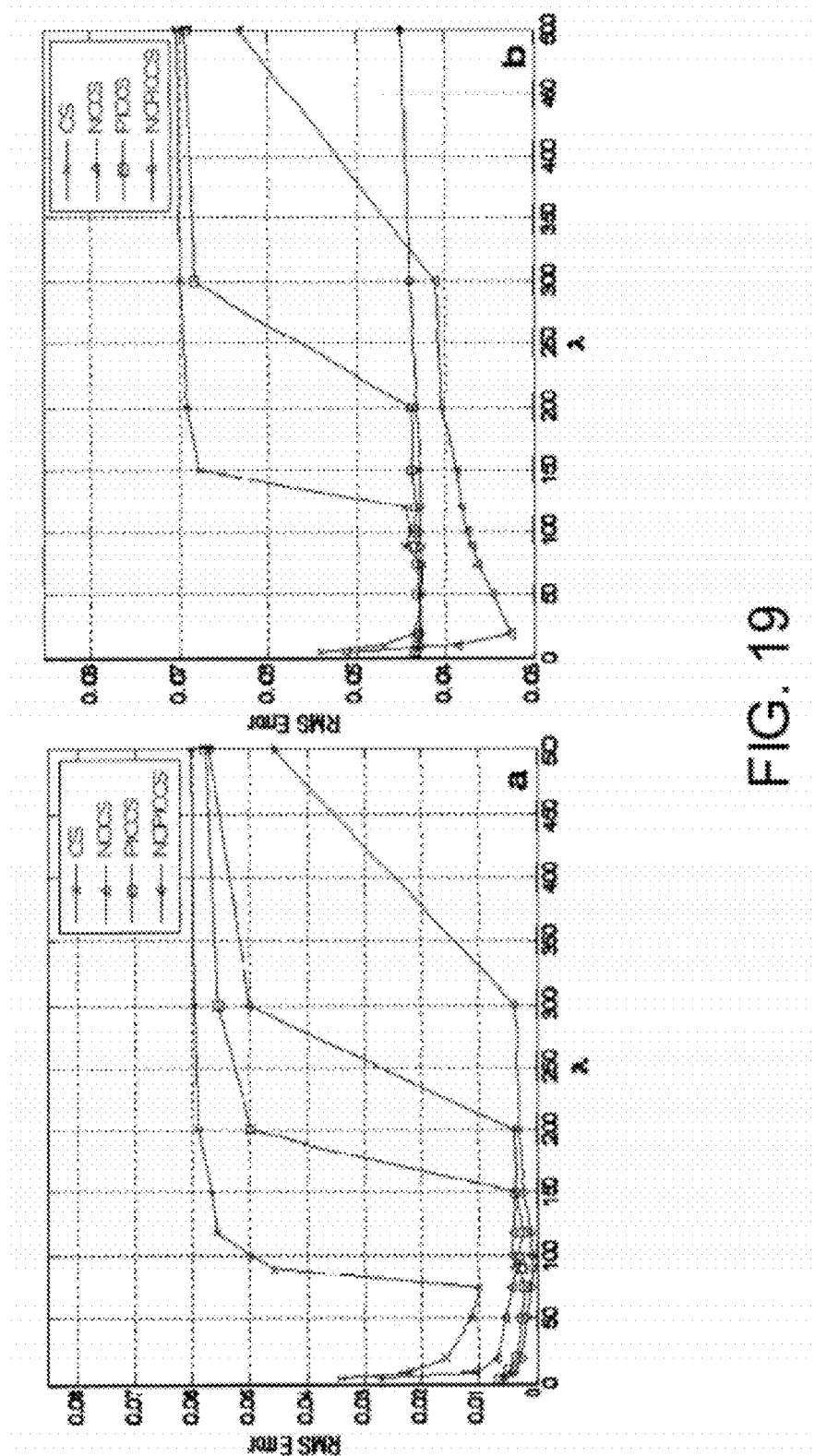
FIG. 19 is an example of numerical search of $\lambda_{opt}$ at 20 projections for noise free condition (a) and Poisson noise added (b)

As illustrated in FIG. 19, reconstruction accuracy depends on appropriate selection of λ and $\lambda_{opt}$ for each condition established in Table 1. When the search of $\lambda_{opt}$ had large areas of flatness (indicating several values giving similar results on RMS error) a common $\lambda_{opt}$ was employed for each method to facilitate comparisons. Nonconvex methods has broader ranges of $\lambda_{opt}$ that provided low RMS error compared to their convex counterparts, both in noise free (FIG. 19A) and noise added (FIG. 19B) conditions.

Figure 20:
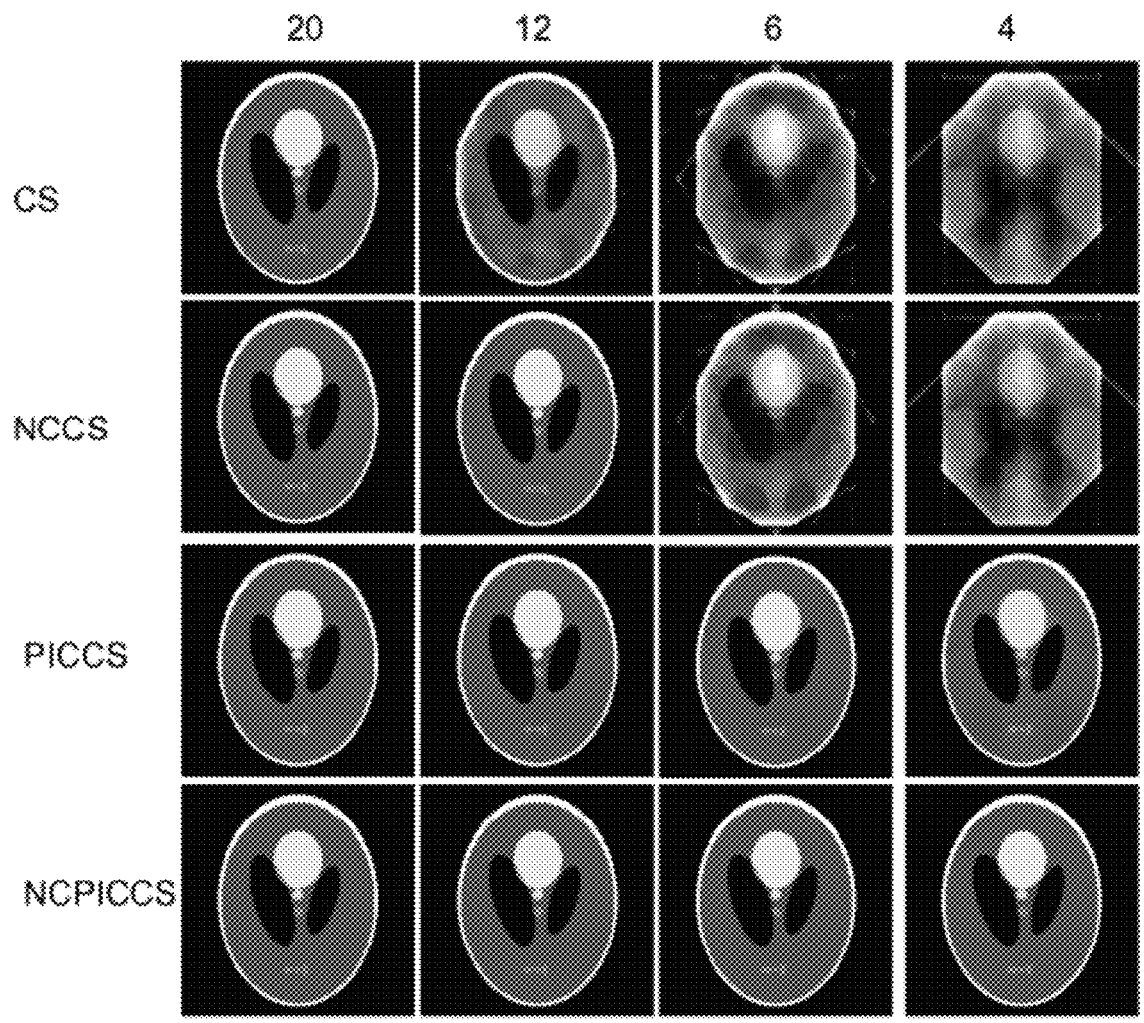
FIG. 20 illustrates noise free reconstructed Shepp-Logan phantoms under 4 levels of undersampling: 20, 12, 6 and 4 (columns 1, 2, 3 and 4 respectively); and 4 compressed sensing based methods: CS, NCCS, PICCS and NCPICCS (rows 1, 2, 3 and 4 respectively), where the images were reconstructed at time point t=2.5 s.

From the noise free simulation it is observed that nonconvex methods (NCCS, NCPICCS) required fewer projections to accurately reconstruct the idealized dynamic Shepp-Logan phantom images than did their convex analogs (CS, PICCS). While CS required 20 projections to reconstruct the phantom, NCCS was able to reconstruct the phantom with only 12 projections, both with no use of prior images (FIG. 20). There was a significant gain in undersampling potential by using a prior image in the reconstruction process, requiring only 6 projections (PICCS, NCPICCS) or 4 projections (NCPICCS) for accurate reconstruction (FIG. 20).

Figure 21:
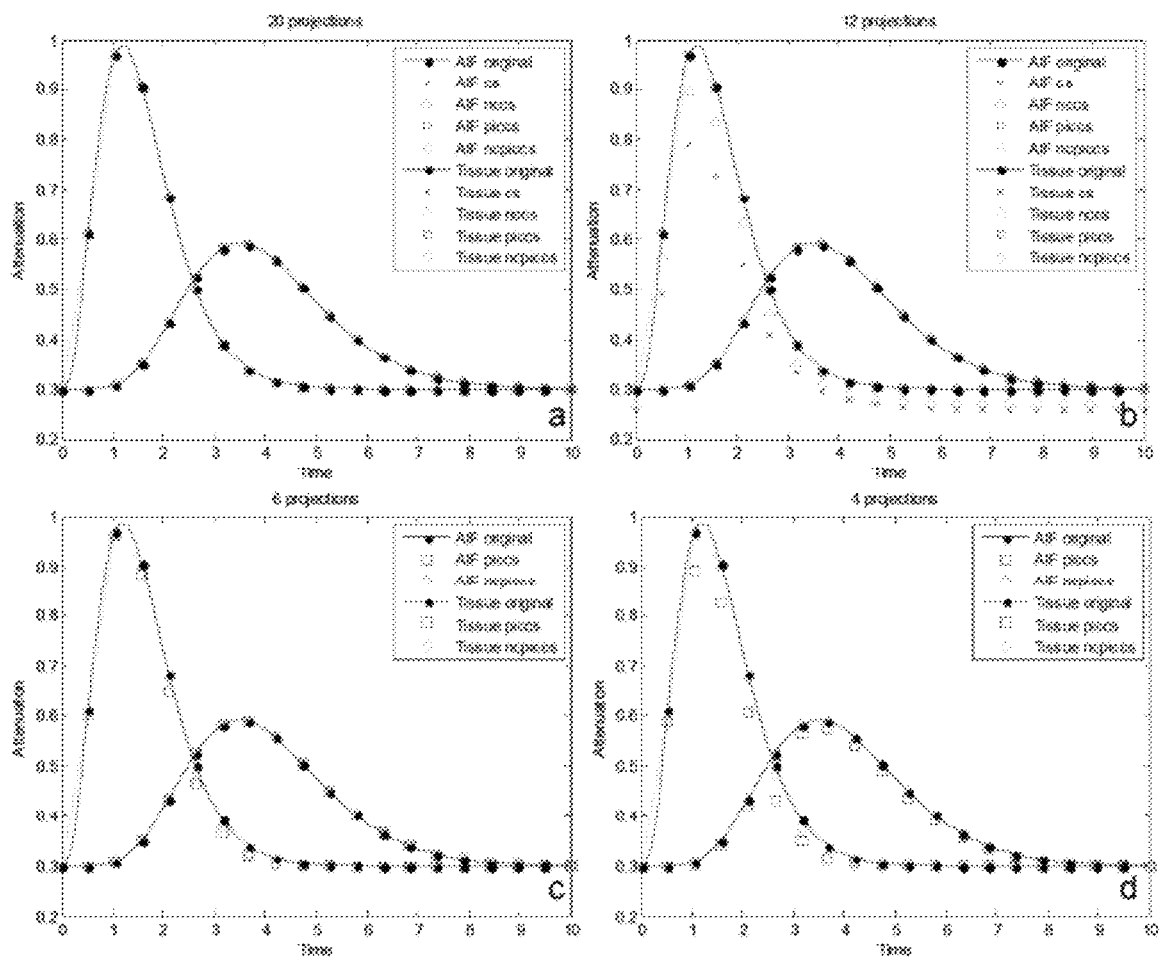
FIG. 21 illustrates the accuracy of arterial input function (AIF) and tissue perfusion (tissue) of simulated dynamic data under noise free conditions at 20 projections (a), 12 projections (b), 6 projections (c), and 4 projections (d)

When the time density curves of the AIF and tissue ROIs were plotted, all methods reproduced the curves with a high degree of accuracy when enough projections were used (FIG. 21). NCPICCS provided high accuracy for as few as 4 projections, PICCS at 6 projections and NCCS at 12 projections (Table 2).

TABLE 2

Measured root mean squared (RMS) error of reconstructed images and time density curves using 4 CS-based methods.

| | | RMS Error | | | | | |
|---|---|---|---|---|---|---|---|
| | | Average Reconstruction | | Arterial Input Function | | Tissue Perfusion | |
| Condition | Projections | Noise free | Noise added | Noise free | Noise added | Noise free | Noise added |
| Ideal | 360 | NA | 0.0434 | NA | 0.00423 | NA | 0.00414 |
| CS | 20 | 0.0034 | 0.0396 | 0.00086 | 0.01386 | 0.00016 | 0.00390 |
| NCCS | 20 | 0.0023 | 0.0321 | 0.00435 | 0.01960 | 0.00003 | 0.00440 |
| PICCS | 20 | 0.0006 | 0.0424 | 0.00102 | 0.01560 | 0.00004 | 0.00366 |
| NCPICCS | 20 | 0.0003 | 0.0423 | 0.00244 | 0.01195 | 0.00013 | 0.00407 |
| CS | 12 | 0.0892 | 0.0975 | 0.08173 | 0.13723 | 0.00199 | 0.00227 |
| NCCS | 12 | 0.0021 | 0.0764 | 0.03953 | 0.04538 | 0.00168 | 0.00349 |
| PICCS | 12 | 0.0006 | 0.0474 | 0.00260 | 0.03579 | 0.00007 | 0.00374 |
| NCPICCS | 12 | 0.0003 | 0.0424 | 0.00307 | 0.01716 | 0.00016 | 0.00416 |
| CS | 6 | 0.1352 | 0.1362 | 0.21383 | 0.23368 | 0.01303 | 0.01943 |
| NCCS | 6 | 0.1429 | 0.1432 | 0.19754 | 0.20175 | 0.00886 | 0.01878 |
| PICCS | 6 | 0.0037 | 0.0429 | 0.01476 | 0.08542 | 0.00080 | 0.01016 |
| NCPICCS | 6 | 0.0006 | 0.0422 | 0.00724 | 0.03332 | 0.00049 | 0.00669 |
| CS | 4 | 0.1702 | 0.1667 | 0.24714 | 0.26216 | 0.07659 | 0.08409 |
| NCCS | 4 | 0.1754 | 0.1729 | 0.18484 | 0.22358 | 0.07658 | 0.08411 |
| PICCS | 4 | 0.0089 | 0.0625 | 0.03685 | 0.15945 | 0.01047 | 0.03153 |
| NCPICCS | 4 | 0.0028 | 0.0426 | 0.00865 | 0.04575 | 0.00233 | 0.01926 |

Figure 22:
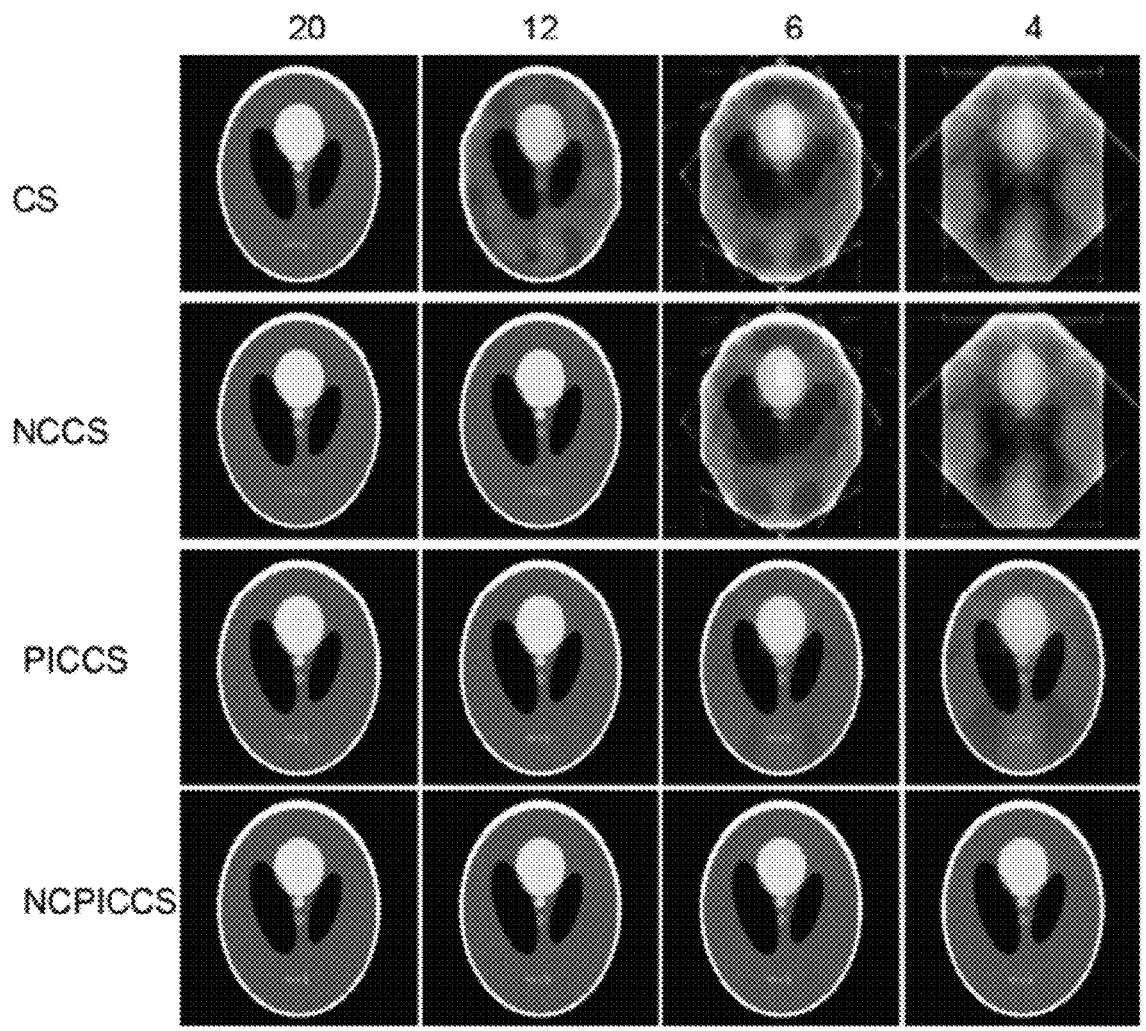
FIG. 22 illustrates the Poisson noises added and reconstructed Shepp-Logan phantoms under 4 levels of undersampling: 20, 12, 6 and 4 (columns 1, 2, 3 and 4 respectively); and 4 compressed sensing based methods: CS, NCCS, PICCS and NCPICCS (rows 1, 2, 3 and 4 respectively), where the images were reconstructed at time point t=2.5 s.
Figure 23:
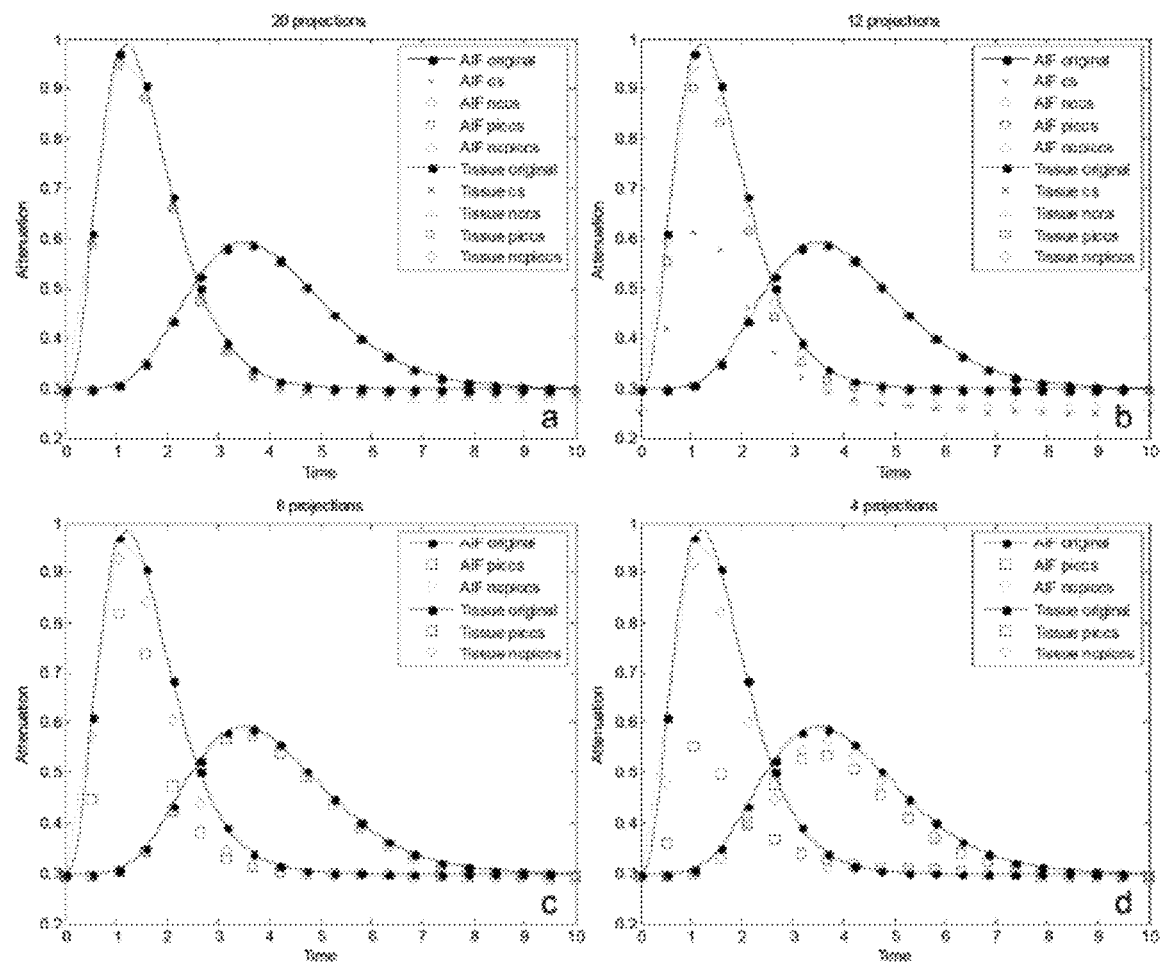
FIG. 23 illustrates the accuracy of arterial input function (AIF) and tissue perfusion (tissue) of simulated dynamic data under Poisson noise added conditions at 20 projections (a), 12 projections (b), 6 projections (c), and 4 projections (d)
Figure 24:
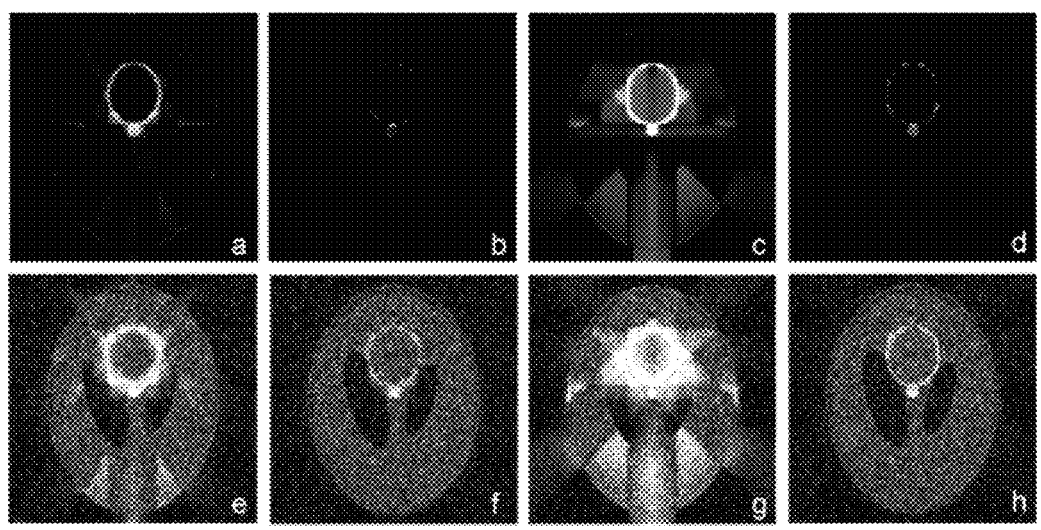
FIG. 24 illustrates the absolute error comparison between Shepp0-Logan phantom images reconstructed with PICCS (a, c, e, and g) and NCPICCS (b, d, f, h), under noise-free conditions (a-d) and Poisson noise added to projections (e-h) at 6 projections (a, b, e, f) and 4 projections. (c, d, g, h) Display window is [0, 0.05], range of original data [0, 1]

Results are similar to the above when Poisson noise was added to the simulated projections (FIG. 22 and FIG. 23). For the reconstructions with added noise and 20 or 12 projections, there was a significant difference between methods employing prior images (PICCS, NCPICCS) and methods that did not (CS, NCCS). Image noise was lower on CS and NCCS reconstructions, but some details of the smallest objects were lost (FIG. 22). PICCS and NCPICCS images preserved well both the large and small structures, and also preserved the characteristic noise texture of CT images. As in the noise-free case, the performance of NCPICCS was superior at the highest degree of undersampling (4 projections), about the same as PICCS and NCCS at 12 projections, and all methods performed well at 20 projections (Table 2). Detailed absolute error for images reconstructed at 4 and 6 projections, under both noise free and noise added conditions, illustrated a higher degree of accuracy of the NCPICCS in comparison to PICCS (FIG. 24).

Figure 25:
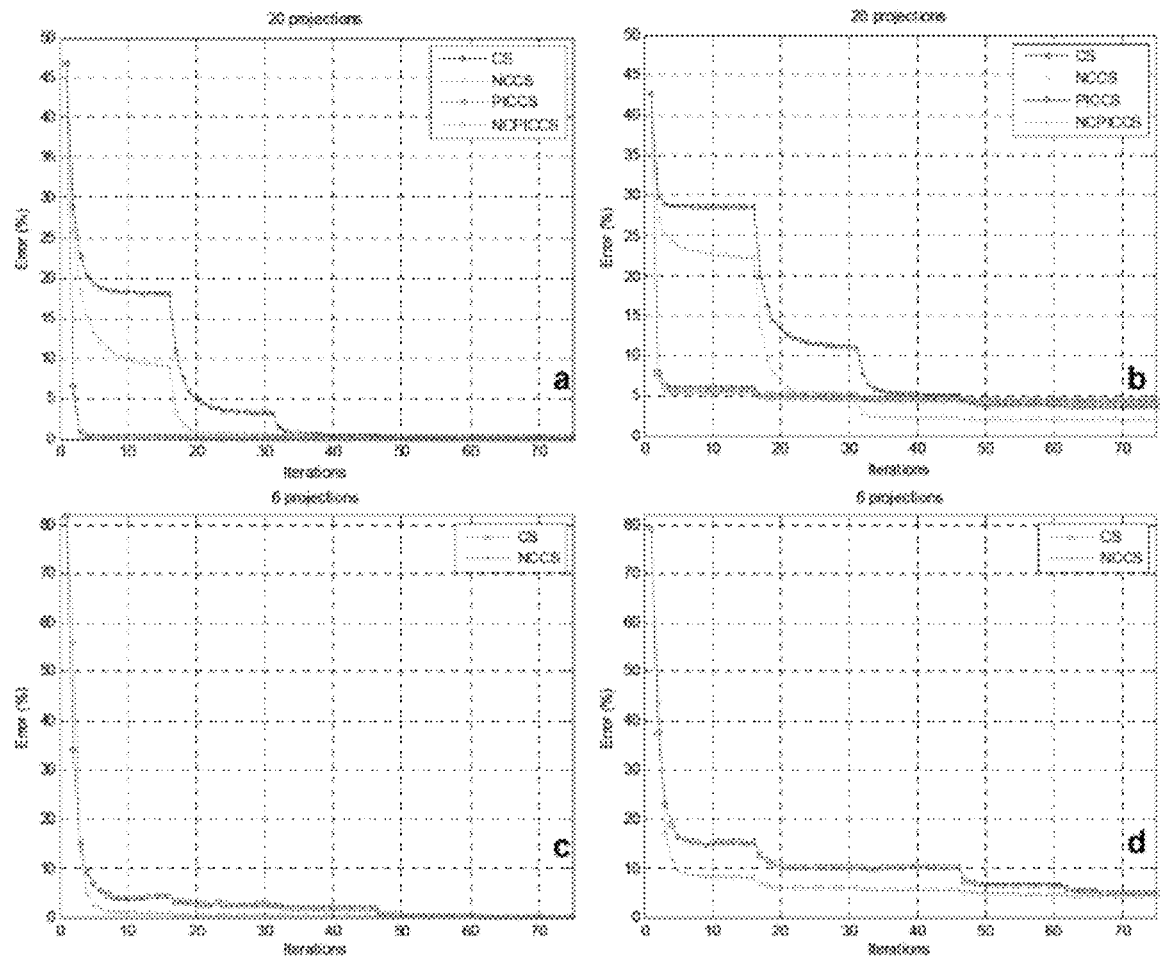
FIG. 25 illustrates the convergence speed of CS-based image reconstruction methods under noise free conditions (a, c), Poisson noise added (b, d); at 20 projections (a, b) and 6 projections (c, d)

While all 4 methods provided good reconstructions at 20 projections, convergence speed was improved by the use of either nonconvex functions or prior images alone (FIG. 25). Reconstructions employing nonconvex functions consistently converged faster than those using convex ones, and they usually converged to a lower RMS error as well. The greatest gain in convergence speed, however, was seen when prior image information was employed. This observation was consistent through all simulated undersampling levels with and without added noise. Fastest convergence was achieved, in all simulation conditions, when employing NCPICCS. The bumps in the RMS curves occur when an outer loop parameter is decreased in the optimization routine (FIG. 25).

Example 2

In Vivo Data Simulation

Figure 18:
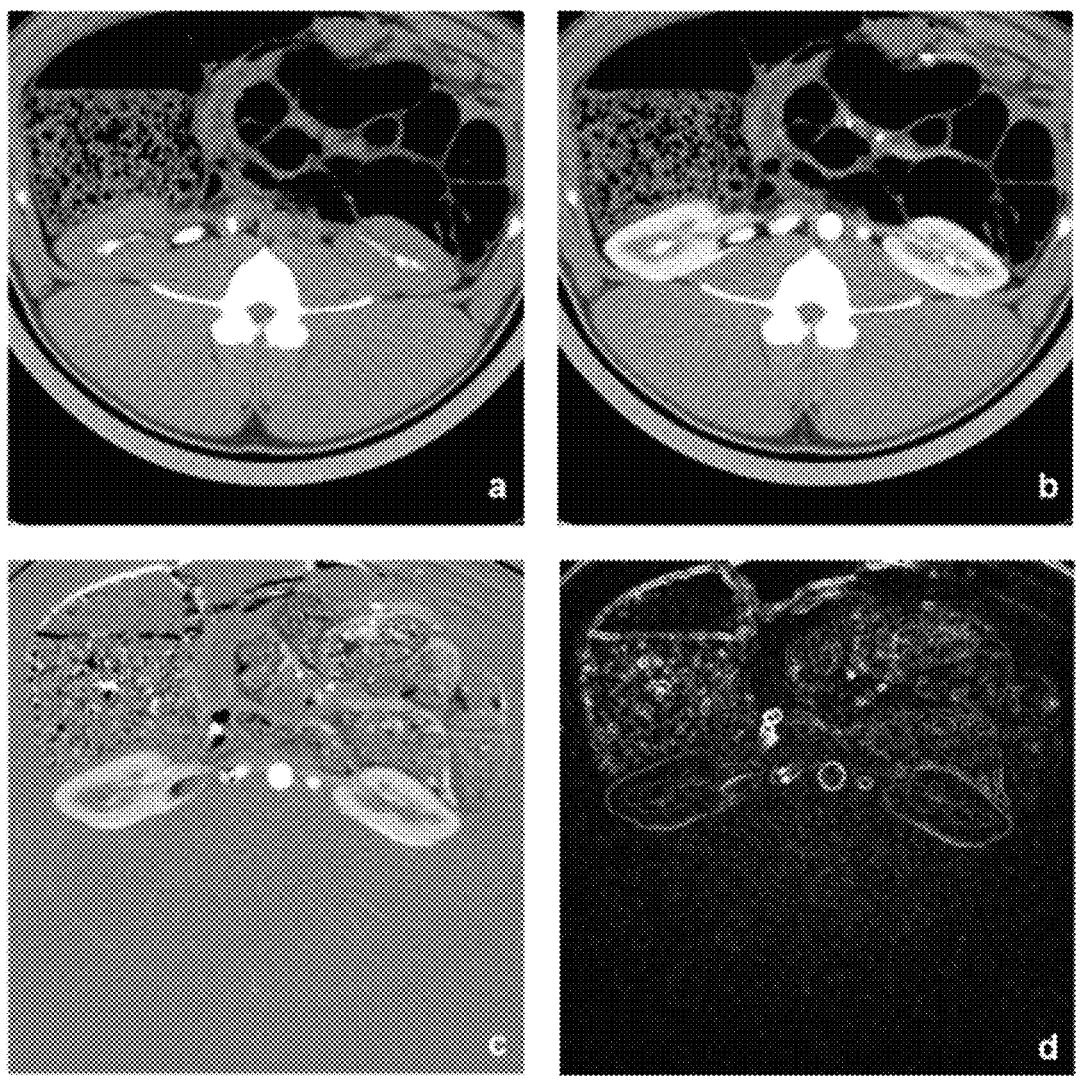
FIG. 18 illustrates a comparison of prior image with no contrast enhancement (a) and sample target image to reconstruct (b) for in vivo animal study; and demonstration of sparsity on difference image with enhanced background (c) and spatial gradient magnitude of difference image (d). Window levels are WL=40 HU and WW=350 HU for a and b, WL=0 HU and WW=400 HU for c, and WL=50 HU and WW=100 for p.

A simulation was performed using in vivo data acquired from a CT kidney perfusion animal study. Scans were performed at 80 kV, using 160 mAs, with 24×1.2 mm collimation and 0 mm table feed. Using a 0.33-second gantry rotation time, 70 exposures were acquired with 0.67-second interval, followed by another 70 exposures with 2-second interval, bringing the total scanning time to about 3 minutes. From these scans, 17 exposures were selected as representative time-points of the time attenuation curve, with no loss in generality since reconstructed images for each time-point are independent of each other. The first image of the dataset was reconstructed using all available projections, and served as the high SNR prior image $x_{pr}$. The remaining 16 images were reconstructed using all available projections (original data) and using 22 and 16 projections. Time attenuation curves (TACs) were calculated by tracing a manual region of interest (ROI) on the cortex of one of the kidneys and recording the mean CT numbers. Examples of the prior image and one of the other 16 images are provided as shown in FIG. 18, in addition to examples demonstrating the sparsity of the difference image and image gradient transform. Reconstructions were also performed using 60 projections for a separate study of noise texture preservation.

Results

Figure 26:
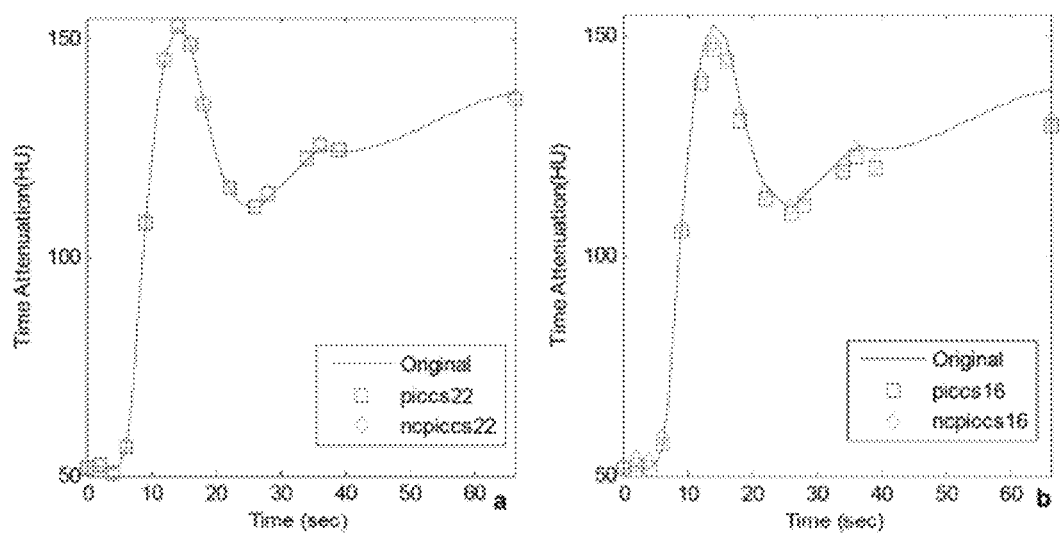
FIG. 26 illustrates the time attenuation curves (TACs) of in vivo data simulation at 22 projections (a) and 16 projections (b)
Figure 27:
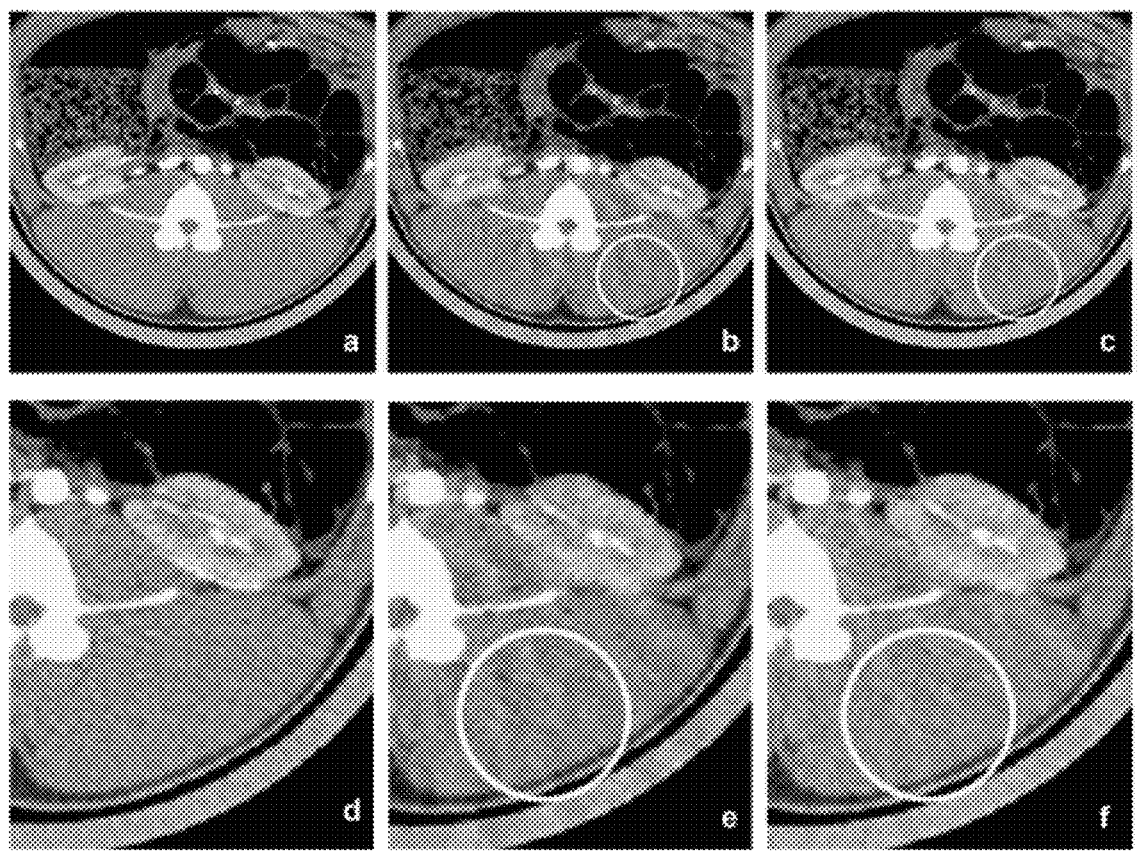
FIG. 27 illustrates images of in vivo data simulation reconstructed with conventional filtered backprojection and using all available projections (a, d), PICCS using only 22 projections (b, e), and NCPICCS using only 22 projections (c, f). Display window is WL=40 HU, WW=350 HU.

Both PICCS and NCPICCS were able to recover the TACs with either 22 or 16 projections, although accuracy started to decrease for the 16 projection case (FIG. 26) The results suggest that on real data the difference in accuracy of perfusion TACs for the convex and nonconvex PICCS may be small, in contrast to the larger difference observed in the simulated phantom experiments. Although they provided similar TACs, the quality of images reconstructed with NCPICCS was less affected by streaking artifacts at the lowest number of projections (FIG. 27). NCPICCS also provided the advantage of faster convergence.

Another aspect of CS reconstructions that is relevant to CT is the depiction of noise texture. When evaluating image reconstructions from filtered backprojection and all four CS algorithms using 60 projections (FIG. 28), it was evident that only the PICCS and NCPICCS results maintained a noise texture similar to the original. These results agree with previous observations in which prior image constrained methods better preserve noise texture characteristics of CT images when compared to conventional CS methods, which can tend to over smooth images, giving an artificial impression.

Discussion of Examples

NCPICCS expands on known methods such as compressed sensing and prior image constrained compressed sensing (PICCS) that employ the convex $l_1$-norm. The main benefits of NCPICCS found using the dynamic Shepp-Logan phantom simulations were the higher undersampling potential compared to CS, NCCS and PICCS, as well as faster convergence speed when solving the same reconstruction task with a fixed number of iterations. For this simulated perfusion data, NCPICCS provided the most accurate TAC at very high degrees of undersampling (i.e. 4 projections), and was the only method capable of accurately reconstructing the images at such undersampling levels. In general, all methods had similar TAC accuracy when the number of projections for a given method was high enough to allow accurate reconstruction.

NCCS outperformed CS when no prior image information was available, not only by allowing reconstruction of images with a lower number of projections, but also converging using fewer iterations. The use of prior image information (PICCS and NCPICCS) improved reconstructions over both CS and NCCS, and also sped up convergence significantly. NCPICCS outperformed our implementation of PICCS in both image reconstruction and TAC accuracy at extremely low numbers of projections, with both methods employing the same numerical implementation.

Figure 28:
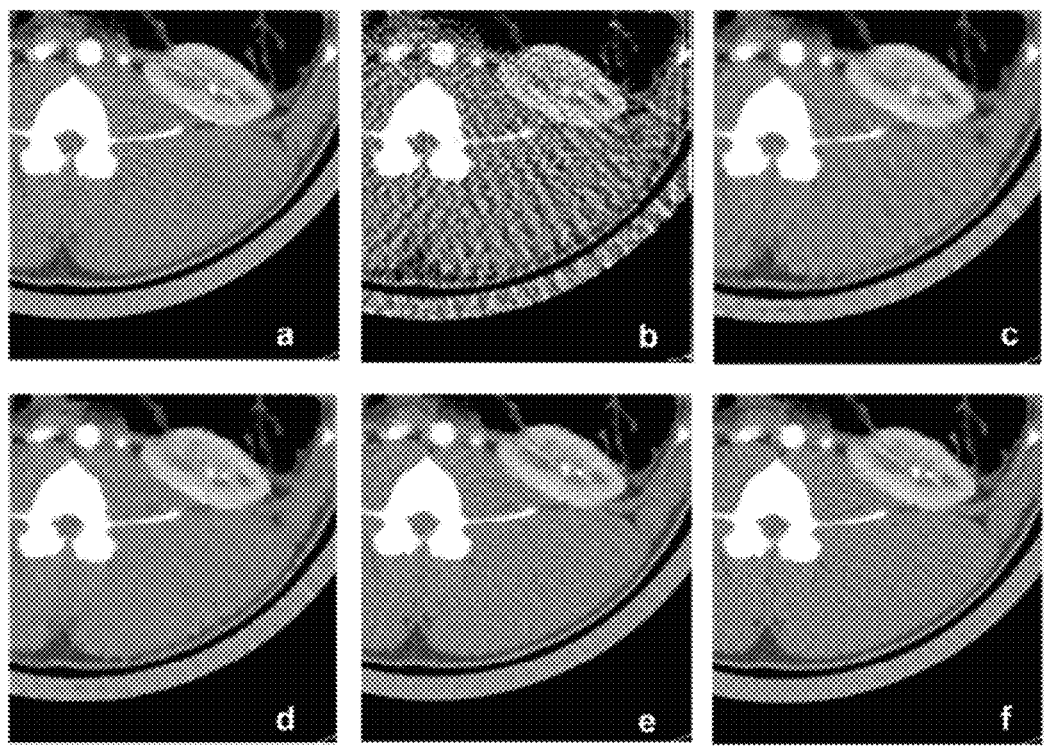
FIG. 28 illustrates a comparison of noise texture of original data and reconstructed images using 60 projections (a), and filtered backprojection (b), CS (c), NCCS (d), PICCS (e), and NCPICCS (f). Display window is WL=40 HU, WW=350 HU.

The prior image constrained methods also did a better job at preserving the noise texture characteristics of CT images compared to the conventional CS methods, as shown by the animal experiments using 60 projections (FIG. 28). At 20 and 12 projections, image noise was lower in CS and NCCS reconstructions than in NCPICCS or PICCS (FIG. 22). Prior image constrained methods maintain fidelity to the noise-corrupted image, hence some noise error is unavoidably propagated into the solution (FIG. 25B).

NCPICCS provided significant practical advantages using the numerical implementation described. First, NCPICCS typically performs better over a broader range of choices for the regularization parameter λ (FIG. 19). Second, because iterative reconstruction methods are computationally expensive, the faster convergence speed of NCPICCS can be an important advantage.

What is claimed is:

1. A method comprising:
   receiving a plurality of image datasets, each image dataset acquired at one of a plurality of time points, from an image acquisition device;
   storing the plurality of image datasets in a data storage device;
   selecting a first dataset corresponding to a first time point;
   selecting a first group of datasets corresponding to a range of time points that includes the first time point; and
   generating, using a data processor, an output image corresponding to the first time point according to a non-convex prior image constrained compressed sensing algorithm performed on the first data using information from the first group of datasets;
   where the algorithm minimizes a non-convex objective function using non-convex priors $l_p$-functional in which $0<p<1$.

2. The method of claim 1, further comprising storing the output image in a data storage device.

3. The method of claim 1, further comprising displaying the image on an image display device.

4. The method of claim 1, where the first dataset corresponds to a first image and the first group of datasets corresponds to a first composite image.

5. The method of claim 1, where generating the output image further comprises computing a gradient in response to the first dataset and the first group of datasets, the gradient indicating a direction for adjusting the first dataset.

6. The method of claim 5, where computing the gradient comprises calculating, using the data processor, a result of $L(x)=\alpha\Psi_1^*\Lambda(x-x_{pr})\Psi_1(x-x_{pr})+(1-\alpha)\Psi_2^*\Lambda(x)\Psi_2 x+\lambda\Phi^*\Phi x-\lambda\Phi^* f$ in response to the first dataset and the first group of datasets.

7. The method of claim 6, where generating the output image further comprises calculating, using the data processor, a result of the function $B(x)=\alpha\Psi_1^*\Lambda(x-x_{pr})\Psi_1+(1-\alpha)\Psi_2^*\Lambda(x)\Psi_2+\lambda\Phi^*\Phi$ in response to the first dataset and the first group of datasets.

8. The method of claim 7, where generating the output image further comprises calculating, using the data processor, a result of the function $x_{t+1}=x_t-B^{-1}(x_t)L(x_t)$.

9. The method of claim 8, where the non-convex prior image constrained compressed sensing algorithm runs iteratively until a predetermined stopping criteria is reached.

10. The method of claim 9, where the predetermined stopping criteria comprises a predetermined range of results of the function of claim 7, the predetermined range of results centered about a value of zero.

11. The method of claim 9, where the predetermined stopping criteria comprises a preselected number of calculation iterations.

12. The method of claim 9, comprising:
   selecting a second dataset corresponding to a second time point in response to a determination that the predetermined stopping criteria was reached for the first dataset;
   selecting a second group of datasets corresponding to a range of time points that includes the second time point; and
   generating, using the data processor, an output image corresponding to the second time point according to the non-convex prior image constrained compressed sensing algorithm performed on the second data using information from the second group of datasets.

13. The method of claim 1, further comprising acquiring the plurality of image datasets with an image acquisition device.

14. The method of claim 13, where the image acquisition device is a Computed Tomography (CT) scanner.

15. A tangible computer program product comprising a computer readable medium having computer usable program code, that when executed by a computer, cause the computer to perform operations comprising:
   receiving a plurality of image datasets, each image dataset acquired at one of a plurality of time points;
   storing the plurality of image datasets;
   selecting a first dataset corresponding to a first time point;
   selecting a first group of datasets corresponding to a range of time points that includes the first time point; and
   generating an output image corresponding to the first time point according to a non-convex prior image constrained compressed sensing algorithm performed on the first data using information from the first group of datasets;
   where the algorithm minimizes a non-convex objective function using non-convex priors $l_p$-functional in which $0<p<1$.

16. The tangible computer program product of claim 15, the operations further comprising storing the output image.

17. The tangible computer program product of claim 15, the operations further comprising displaying the image.

18. The tangible computer program product of claim 15, where the first data set corresponds to a first image and the first group of datasets corresponds to a first composite image.

19. The tangible computer program product of claim 15, where generating the output image further comprises computing a gradient in response to the first dataset and the first group of datasets, the gradient indicating a direction for adjusting the first dataset.

20. The tangible computer program product of claim 19, where computing the gradient comprises calculating a result of $L(x)=\alpha\Psi_1^*\Lambda(x-x_{pr})\Psi_1(x-x_{pr})+(1-\alpha)\Psi_2^*\Lambda(x)\Psi_2 x+\lambda\Phi^*\Phi x-\lambda\Phi^*f$ in response to the first dataset and the first group of datasets.

21. The tangible computer program product of claim 20, where generating the output image further comprises calculating a result of the function $B(x)=\alpha\Psi_1^*\Lambda(x-x_{pr})\Psi_1+(1-\alpha)\Psi_2^*\Lambda(x)\Psi_2+\lambda\Phi^*\Phi$ in response to the first dataset and the first group of datasets.

22. The tangible computer program product of claim 21, where generating the output image further comprises calculating a result of the function $x_{t+1}=x_t-B^{-1}(x_t)L(x_t)$.

23. The tangible computer program product of claim 22, where the non-convex prior image constrained Compressed sensing algorithm runs iteratively until a predetermined stopping criteria is reached.

24. The tangible computer program product of claim 23, where the predetermined stopping criteria comprises a predetermined range of results of the function of claim 21, the predetermined range of results centered about a value of zero.

25. The tangible computer program product of claim 23, where the predetermined stopping criteria comprises a preselected number of calculation iterations.

26. The tangible computer program product of claim 23, where the operations further comprise:
   selecting a second dataset corresponding to a second time point in response to a determination that the predetermined stopping criteria was reached for the first dataset;
   selecting a second group of datasets corresponding to a range of time points that includes the second time point; and
   generating, using a data processor, an output image corresponding to the second time point according to the non-convex prior image constrained compressed sensing algorithm performed on the second data using information from the second group of datasets.

27. The tangible computer program product of claim 15, the operations further comprising acquiring the plurality of image datasets with an image acquisition device coupled to the computer.

28. The tangible computer program product of claim 27, where the image acquisition device is a Computed Tomography (CT) scanner.

29. A system comprising:
   an image acquisition device configured to acquire a plurality of image datasets, each image dataset acquired at one of a plurality of time points;
   a data storage device configured to store the plurality of image datasets; and
   a data processing device coupled to the image acquisition device and the data storage device, the data processing device comprising:
      an input adapter configured to receive the plurality of image datasets; and
      a processor, coupled to the input adapter, configured to:
         select a first dataset corresponding to a first time point;
         select a first group of datasets corresponding to a range of time points that includes the first time point; and
         generate an output image corresponding to the first time point according to a non-convex prior image constrained compressed sensing algorithm performed on the first data using information from the first group of datasets;
         where the algorithm is configured to minimize a non-convex objective function using non-convex priors $l_p$-functional in which $0<p<1$.

30. The system of claim 29, where the image acquisition device comprises a Computed Tomography (CT) scanner.

31. The system of claim 29, where the image acquisition device comprises a Magnetic Resonance Imaging (MRI) scanner.

32. The system of claim 29, further comprising an image display device, coupled to at least one of the data storage device and the data processing device, configured to display the output image.

33. An apparatus comprising:
   an input adapter configured to receive a plurality of image datasets, each image dataset acquired at one of a plurality of time points by an image acquisition device;
   a memory device, coupled to the input adapter, configured to store the plurality of image datasets; and
   a processor, coupled to the memory, configured to:
      select a first dataset corresponding to a first time point;
      select a first group of datasets corresponding to a range of time points that includes the first time point; and
      generate an output image corresponding to the first time point according to a non-convex prior image constrained compressed sensing algorithm performed on the first data using information from the first group of datasets;
      where the algorithm is configured to minimize a non-convex objective function using non-convex priors $l_p$-functional in which $0<p<1$.

* * * * *